United States Patent
Yamazoe et al.

(10) Patent No.: US 10,372,367 B2
(45) Date of Patent: Aug. 6, 2019

(54) NON-VOLATILE MEMORY DEVICE, NON-VOLATILE MEMORY CONTROL DEVICE, AND NON-VOLATILE MEMORY CONTROL METHOD

(71) Applicant: Sony Corporation, Tokyo (JP)

(72) Inventors: Hiroaki Yamazoe, Tokyo (JP); Daisuke Nakajima, Tokyo (JP); Toshifumi Nishiura, Tokyo (JP); Kan Nagashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 46 days.

(21) Appl. No.: 14/395,369

(22) PCT Filed: Feb. 28, 2013

(86) PCT No.: PCT/JP2013/056201
§ 371 (c)(1),
(2) Date: Oct. 17, 2014

(87) PCT Pub. No.: WO2013/161398
PCT Pub. Date: Oct. 31, 2013

(65) Prior Publication Data
US 2015/0120992 A1    Apr. 30, 2015

(30) Foreign Application Priority Data

Apr. 25, 2012  (JP) .................. 2012-100370

(51) Int. Cl.
*G06F 3/06* (2006.01)
*G06F 12/02* (2006.01)

(52) U.S. Cl.
CPC .......... *G06F 3/0644* (2013.01); *G06F 3/0634* (2013.01); *G06F 12/0246* (2013.01); *G06F 2212/7205* (2013.01)

(58) Field of Classification Search
None
See application file for complete search history.

(56) References Cited

U.S. PATENT DOCUMENTS

| 5,657,468 A * | 8/1997 | Stallmo ................. G06F 3/0601 |
| | | 711/114 |
| 5,745,418 A | 4/1998 | Ma et al. |

(Continued)

FOREIGN PATENT DOCUMENTS

| JP | 2002-513484 | 5/2002 |
| JP | 2007-058840 | 3/2007 |

(Continued)

OTHER PUBLICATIONS

International Search Report issued in connection with International Patent Application No. PCT/JP2013/056201, dated May 21, 2013. (2 pages).

(Continued)

*Primary Examiner* — Sean D Rossiter
*Assistant Examiner* — Charles J Choi
(74) *Attorney, Agent, or Firm* — Chip Law Group

(57) ABSTRACT

A non-volatile memory device includes a non-volatile memory unit, a control unit, and an interface. The control unit receives a write request, determines whether data is an object of a write of sequential management when a write size of the received data is smaller than a management unit of erasure, performs first write processing in which the received data smaller than the management unit of the erasure is sequentially written when the data is the object of the write of the sequential management, and performs second write processing in which the received data smaller than the management unit of the erasure is written by the management unit of the write when the data is not the object of the write of the sequential management.

8 Claims, 42 Drawing Sheets

(56) References Cited

U.S. PATENT DOCUMENTS

| | | | |
|---|---|---|---|
| 8,248,883 B1* | 8/2012 | Lu | G11C 8/06 365/230.01 |
| 2005/0144358 A1 | 6/2005 | Conley et al. | |
| 2005/0144360 A1 | 6/2005 | Bennett et al. | |
| 2007/0028035 A1 | 2/2007 | Nishihara | |
| 2008/0062786 A1* | 3/2008 | Kim | G11C 16/10 365/201 |
| 2008/0104309 A1 | 5/2008 | Cheon et al. | |
| 2008/0235489 A1* | 9/2008 | Gorobets | G06F 12/0246 711/217 |
| 2008/0282041 A1* | 11/2008 | Hartwich | H04L 49/90 711/147 |
| 2011/0167208 A1 | 7/2011 | So et al. | |
| 2011/0238933 A1 | 9/2011 | Fujimoto | |
| 2012/0005415 A1 | 1/2012 | Jung et al. | |
| 2012/0254524 A1* | 10/2012 | Fujimoto | G06F 3/0613 711/103 |

FOREIGN PATENT DOCUMENTS

| | | |
|---|---|---|
| JP | 2007-517319 | 6/2007 |
| JP | 2007-517333 | 6/2007 |
| JP | 2007-517335 | 6/2007 |
| JP | 2007-193883 | 8/2007 |
| JP | 2010-140268 | 6/2010 |
| JP | 2011-175615 | 9/2011 |
| JP | 2011-175615 A | 9/2011 |
| TW | 201201017 A | 1/2012 |
| WO | 2010/146767 | 12/2010 |

OTHER PUBLICATIONS

Office Action for CN Patent Application No. 201380020709.1, dated Aug. 3, 2016, 8 pages of Office Action and 9 pages of English Translation.

Office Action for JP Patent Application No. 2016-154037, dated May 30, 2017, 05 pages of Office Action and 04 pages of English Translation.

Office Action for CN Patent Application No. 201380020709.1, dated Mar. 3, 2017, 10 pages of Office Action and 07 pages of English Translation.

Office Action for EP Patent Application No. 13781055.2, dated May 4, 2018, 8 pages.

* cited by examiner

FIG. 12

| LBlockUnit lb[0] | PBlockUnit pb[0] | LastPageUnit pp[0] |
| LBlockUnit lb[1] | PBlockUnit pb[1] | LastPageUnit pp[1] |

⋮

| 0xFFFF | 0xFFFF | 0xFFFF |

⋮

| LBlockUnit lb[e−1] | PBlockUnit pb[e−1] | LastPageUnit pp[e−1] |

FIG. 14

| LPageUnit 0 | PBlockUnit pb[0] | PPageUnit pp[0] |
| LPageUnit 1 | PBlockUnit pb[1] | PPageUnit pp[1] |
| LPageUnit i | PBlockUnit pb[i] | PPageUnit pp[i] |
| LPageUnit j | 0xFFFF | 0xFFFF |
| LPageUnit lp−1 | PBlockUnit pb[lp−1] | PPageUnit pp[lp−1] |

*FIG. 18*

| LBlockUnit 0 | 0 |
|---|---|
| LBlockUnit 1 | 0 |
| ⋮ | |
| LBlockUnit i | 0 |
| ⋮ | |
| LBlockUnit j | 1 |
| ⋮ | |
| LBlockUnit lb−1 | 0 |

FIG. 27

| | CONVENTIONAL METHOD | DETERMINATION TECHNIQUE 1 | DETERMINATION TECHNIQUE 2 | DETERMINATION TECHNIQUE 3 |
|---|---|---|---|---|
| DETERMINATION SUBJECT OF Sequential WRITE | — | FLASH MEMORY DEVICE | HOST DEVICE | HOST DEVICE |
| CONTROL OF Sequential MANAGEMENT TABLE BY Host | — | DOES NOT CONTROL | ONLY REGISTER | REGISTER AND DELETE |
| SUBJECT WHICH CAN ACCESS TO Sequential MANAGEMENT TABLE | — | FLASH MEMORY DEVICE | FLASH MEMORY DEVICE | FLASH MEMORY DEVICE AND HOST DEVICE |
| GARBAGE COLLECTION OF Sequential WRITE | OCCUR | DOES NOT OCCUR | DOES NOT OCCUR | DOES NOT OCCUR |
| BREAK OF Sequentiality | — | GARBAGE COLLECTION | NOT RECEIVED BY USING COMMAND | NOT RECEIVED BY USING COMMAND |
| A CASE WHERE THERE IS NO FREE SPACE IN Sequential MANAGEMENT TABLE | — | GARBAGE COLLECTION | GARBAGE COLLECTION | NOT RECEIVED BY USING COMMAND |

FIG. 28

| | CONVENTIONAL METHOD | DETERMINATION TECHNIQUE 1 | DETERMINATION TECHNIQUE 2 | DETERMINATION TECHNIQUE 3 |
|---|---|---|---|---|
| WRITE METHOD 1<br>PPageUnit MANAGEMENT TABLE: EMPTY<br>Sequential MANAGEMENT TABLE: EMPTY<br>BREAK OF Sequentiality: NO | PPageUnit MANAGEMENT TABLE IS CONSUMED | Sequential MANAGEMENT TABLE IS USED | Sequential MANAGEMENT TABLE IS USED | Sequential MANAGEMENT TABLE IS USED |
| WRITE METHOD 2<br>PPageUnit MANAGEMENT TABLE: FULL<br>Sequential MANAGEMENT TABLE: EMPTY<br>BREAK OF Sequentiality: NO | GARBAGE COLLECTION | Sequential MANAGEMENT TABLE IS USED | Sequential MANAGEMENT TABLE IS USED | Sequential MANAGEMENT TABLE IS USED |
| WRITE METHOD 3<br>PPageUnit MANAGEMENT TABLE: FULL<br>Sequential MANAGEMENT TABLE: EMPTY<br>BREAK OF Sequentiality: NO | GARBAGE COLLECTION | GARBAGE COLLECTION | COMMAND IS NOT RECEIVED | COMMAND IS NOT RECEIVED |
| WRITE METHOD 4<br>PPageUnit MANAGEMENT TABLE: FULL<br>Sequential MANAGEMENT TABLE: FULL<br>BREAK OF Sequentiality: NO | GARBAGE COLLECTION | GARBAGE COLLECTION | GARBAGE COLLECTION | COMMAND IS NOT RECEIVED |

NON-VOLATILE MEMORY DEVICE, NON-VOLATILE MEMORY CONTROL DEVICE, AND NON-VOLATILE MEMORY CONTROL METHOD

CROSS REFERENCES TO RELATED APPLICATIONS

The present application is a national stage of International Application No. PCT/JP2013/056201 filed on Feb. 28, 2013 and claims priority to Japanese Patent Application No. 2012-100370 filed on Apr. 25, 2012, the disclosure of which is incorporated herein by reference.

BACKGROUND

The present disclosure relates to a non-volatile memory device, a non-volatile memory control device, and a non-volatile memory control method which can prevent speed reduction caused by a small-sized access.

Recently, a NAND flash has been widely used as a non-volatile memory. In a storage device using the NAND flash, write speed of electronic data changes depending on a write size. Processing called a garbage collection has a large effect on the change (refer to Patent Documents 1 and 2). Since this operation is performed independently from an access by a host device for performing a write to the NAND flash, the operation is associated with instantaneous and rapid reduction of access speed. Therefore, it is necessary to reduce a frequency of the garbage collection to maintain performance.

In a general flash memory device, data written in a flash memory is divided into two kinds, that is, a block unit and a page unit, and managed. Management is performed in which an integral multiple of a block size of the flash memory (referred to as a block unit below) is assumed as one unit in block unit management, and management is performed in which an integral multiple of a page size of the same flash memory (referred to as a page unit below) is assumed as one unit in page unit management. The block includes a plurality of pages. Therefore, it normally becomes (block unit>page unit).

A garbage collection is an operation in which regions managed by the page unit are collected and promoted to the management by the block unit. Therefore, when the write is performed so that the management by the block unit is performed from the beginning, generation of the garbage collection can be prevented. This can be realized by performing the write with the integral multiple of the block units. Therefore, in a case where it is necessary to perform high-speed write, a method in which an access is performed by the integral multiple of the block units has conventionally been used.

CITATION LIST

Patent Document

Patent Document 1: JP 2007-193883 A
Patent Document 2: JP 2007-58840 A

SUMMARY

Problems to be Solved by the Invention

However, the block size and the number of the pages in the block tend to increase year by year according to a trend of flash benders in recent years. Therefore, it is predicted that a buffer size of the host device (maximum access size of one access) falls below a size of the block unit in the near future. The buffer size of an existing device is hardly changed, and the increase in the buffer size of a new device causes cost increase accordingly. Therefore, the technique to suppress the speed reduction caused by the small-sized write is necessary.

This problem is not specific to the NAND flash memory and is common to all the non-volatile memories in which there is a possibility that the buffer size of the host device falls below the management unit of the non-volatile memory device.

Therefore, a purpose of the present disclosure is to provide a non-volatile memory device, a non-volatile memory control device, and a non-volatile memory control method in which a garbage collection is generated by a small-sized access, and as a result, speed reduction can be prevented.

Solutions to Problems

In order to solve the above problem, the present disclosure is the non-volatile memory device which includes a non-volatile memory unit, a control unit, and an interface. The control unit receives a write request, determines whether data is an object of a write of sequential management when a write size of the received data is smaller than a management unit of erasure, performs first write processing in which the received data smaller than the management unit of the erasure is sequentially written when the data is the object of the write of the sequential management, and performs second write processing in which the received data smaller than the management unit of the erasure is written by the management unit of the write when the data is not the object of the write of the sequential management.

The present disclosure is the non-volatile memory control device and control method which receive a write request, determine whether data is an object of a write of sequential management when a write size of the received data is smaller than a management unit of erasure, perform first write processing in which the received data smaller than the management unit of the erasure is sequentially written when the data is the object of the write of the sequential management, and perform second write processing in which the received data smaller than the management unit of the erasure is written by the management unit of the write when the data is not the object of the write of the sequential management.

The present disclosure is the non-volatile memory control device and control method in which a command of a side of a host is defined which instructs to write the data with the sequential management to a specific region of the non-volatile memory device. The size of the data is smaller than the management unit of erasure.

Effects of the Invention

The present disclosure can reduce a frequency of the garbage collection and prevent speed reduction, because the data, which is smaller than the management unit of the erasure, to be determined as the sequential write object is sequentially written in a specific region.

Additional features and advantages are described herein, and will be apparent from the following Detailed Description and the figures.

BRIEF DESCRIPTION OF THE FIGURES

FIG. 12 is a schematic diagram to describe a data structure of the management data for the sequential management.

FIG. 14 is a schematic diagram to describe a data structure of second management data for the P page unit management.

FIG. 18 is a schematic diagram of an exemplary table for a sequential management registration command.

FIG. 27 is a schematic diagram of a table to compare respective determination methods with one another.

FIG. 28 is a schematic diagram of a table to compare a traditional method with the determination methods of the present disclosure.

DETAILED DESCRIPTION

The embodiment to be described below is a preferable example of the present disclosure, and various limitations which are technically preferable are given. However, the scope of the present disclosure is not limited to the embodiment unless there is a description below indicating that the present disclosure is limited.

The description below will be in an order as follows.
<1. One embodiment of the present disclosure>
<2. For other applications>
<3. Modification>

1. One Embodiment of the Present Disclosure

"Outline"

Figure 1:
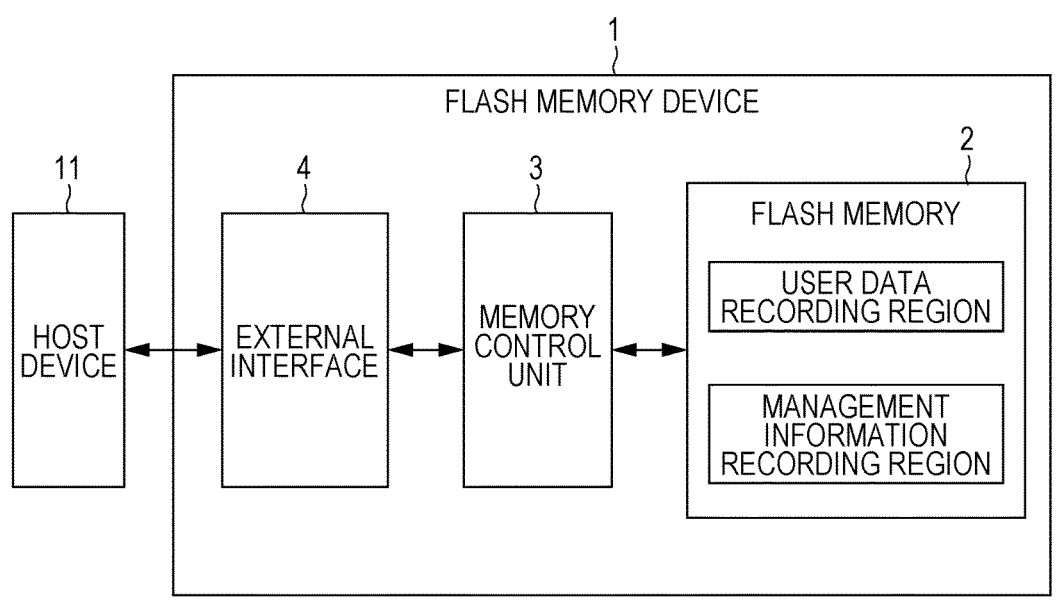
FIG. 1 is a block diagram of an exemplary flash memory device to which the present disclosure can be applied.

An embodiment of the present disclosure will be described below with reference to the drawings. As indicated in FIG. 1, in the embodiment of the present disclosure, a flash memory device 1 includes a flash memory unit 2, a memory control unit 3, and an external interface 4. A specific region only for a sequential management write is prepared in the flash memory unit 2. The memory control unit 3 has a mechanism for sequentially writing the received data in the specific region when the external interface 4 has received a plurality of times of sequential management write requests which are smaller than a block size of the flash memory unit 2 from a host device 11.

In a general flash memory device, a management unit based on a block (referred to as a block unit below) is used as an erasure management unit and a management unit based on a page (referred to as a page unit below) is used as a write management unit. The write of a size which is smaller than the block unit is managed for each page unit. Usually, these managements are independently performed for each write access. Therefore, even when a write request smaller than the plurality of times of logically continuous block units has been issued from the host device, the data is not necessarily continuously written into the same block unit. That is, in the general flash memory device, a logical sequential access does not necessarily become a physical sequential access. Therefore, when the data which is managed by the page unit is collectively managed by the block unit, it is necessary to copy fragment data and collect the copied data in the same block unit. This operation is called a garbage collection. Since the operation of the garbage collection is performed independently from the request by the host device, the host device observes the operation as instantaneous reduction of the access speed.

However, when it has been previously found that the data smaller than the block unit size is sequentially written at the times of a plurality of times of commands, the garbage collection in a case where the data written later is promoted to the block unit management can be avoided by performing the sequential management write of these writes into the same block unit. This is focused in the present disclosure. Therefore, the memory control unit 3 of the flash memory device 1 includes a mechanism for determining sequentiality of the write request from the host device 11 and selecting a physical write determination.

"Data Structures"

Physical Address Space and Logical Address Space

First, it will be described an address space (physical address space) in the flash memory included in the flash memory device 1 of the present disclosure and a virtual address space (logical address space) for data exchange with the host device 11 via the external interface 4.

Figure 2:
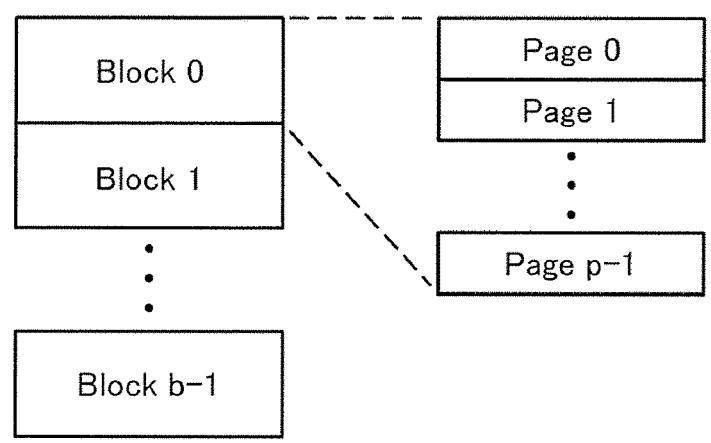
FIG. 2 is a schematic diagram to describe a storage area of a flash memory.

As shown in FIG. 2, a storage area of the flash memory includes a plurality of physical blocks, and a single physical block includes a plurality of physical pages. The physical block is a minimum unit of the erasure, and the physical page is a minimum unit of the write. In consideration of this physical configuration, a physical block address in which the physical blocks are serially numbered and a physical page address in which the physical pages in each physical block are serially numbered are used to address the flash memory.

Figure 3:
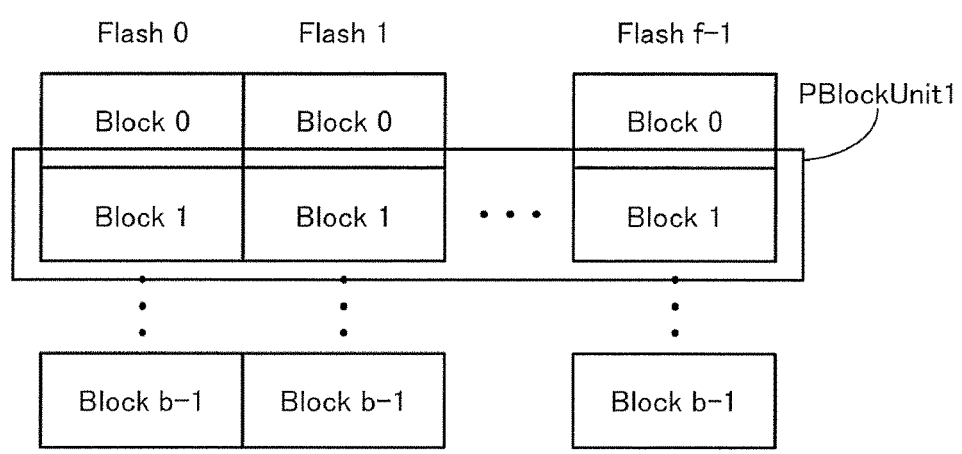
FIG. 3 is a schematic diagram to describe a storage area (P block unit) of a parallelized flash memory.
Figure 4:
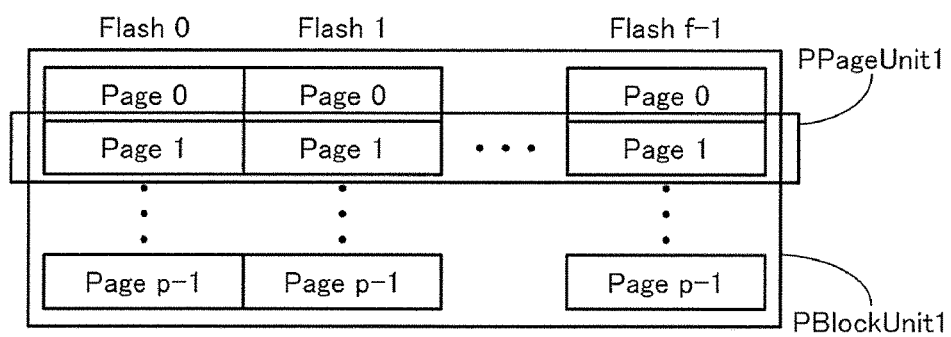
FIG. 4 is a schematic diagram to describe a storage area (P page unit) of the parallelized flash memory.

In order to increase the speed, a plurality of flashes is parallelized. On the assumption of the parallel operation, the physical blocks, in which one physical block is selected from each flash and the selected physical blocks are collected, are referred to as a physical block unit (appropriately referred to as a P block unit) and the physical block unit which is numbered is referred to as a physical block unit address as indicated in FIG. 3 in the present disclosure. Similarly, as indicated in FIG. 4, the physical pages in which one physical page in the same P block unit is collected from each flash are referred to as a physical page unit (appropriately referred to as a P page unit) and the physical page unit which is numbered is referred to as a physical page unit address.

There is an individual difference in the flash memory, and there is a case where read/write erasure of a specific block does not function (defective block). In order to avoid performing the operation to the defective block, the P block unit collects and includes the physical blocks which are not defective. Therefore, the physical block addresses of a physical block group included in the same P block unit may be different from one another. When a parallel number is one, respective sizes of the P block unit and physical block are coincide with each other and respective sizes of the P page unit and physical page are coincide with each other.

Figure 5:
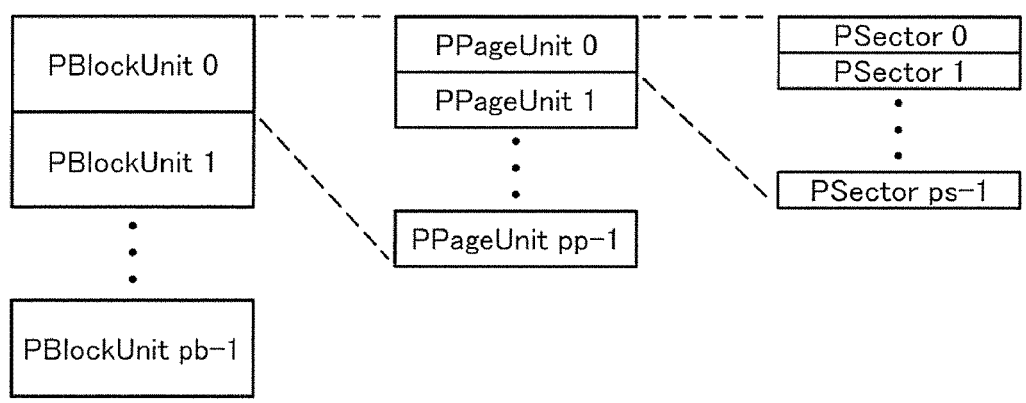
FIG. 5 is a schematic diagram to describe a physical address space of the flash memory.

The physical address space configured by using the above elements is indicated in FIG. 5. The physical address space includes a plurality of P block units (b units), and one P block unit includes a plurality of P page units (p units). To correspond to a minimum size of the logical address space, the P page unit is divided into a plurality of physical sectors (appropriately referred to as a P sector) (s sectors). In order to specify a physical position in the flash memory by using these addresses, it is preferable to specify a P block unit address, a P page unit address, and a P sector address.

Figure 6:
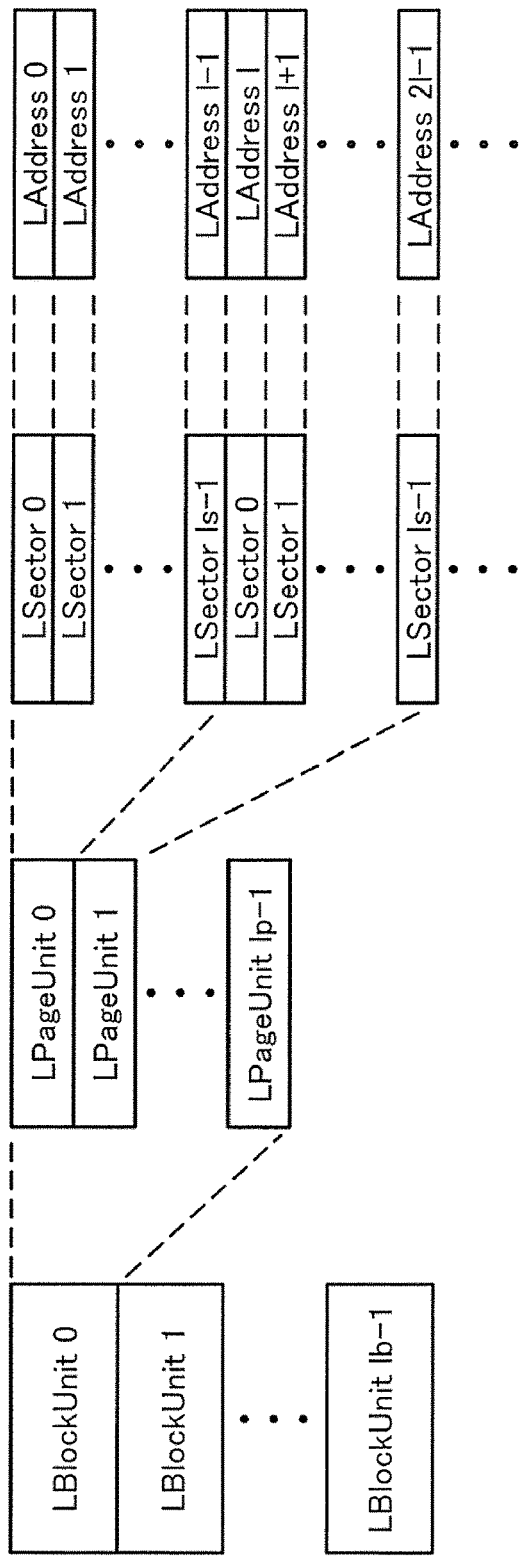
FIG. 6 is a schematic diagram to describe a logical address space.

As indicated in FIG. 6, the logical address space is configured so that it becomes easy to match the above-mentioned physical address space. The logical address space includes a plurality of logical block units (appropriately referred to as an L block unit) (b units), and one L block unit includes a plurality of logical page units (appropriately referred to as an L page unit) (p units). The L page unit is divided into a minimum size of addressing. This is referred to as a logical sector (appropriately referred to as an L sector), and the L sector is addressed. When one logical address is specified, a group of the L sector, the L page unit, and the L block unit corresponding to the logical address is uniquely determined as indicated in FIG. 6.

Data Structure of P Block Unit Holding User Data

A data structure to hold data, which is in a logical space, in a physical space will be described. In the present disclosure, three structures are prepared as the data structure, that is, P block unit management, sequential management, and P page unit management.

Figure 7:
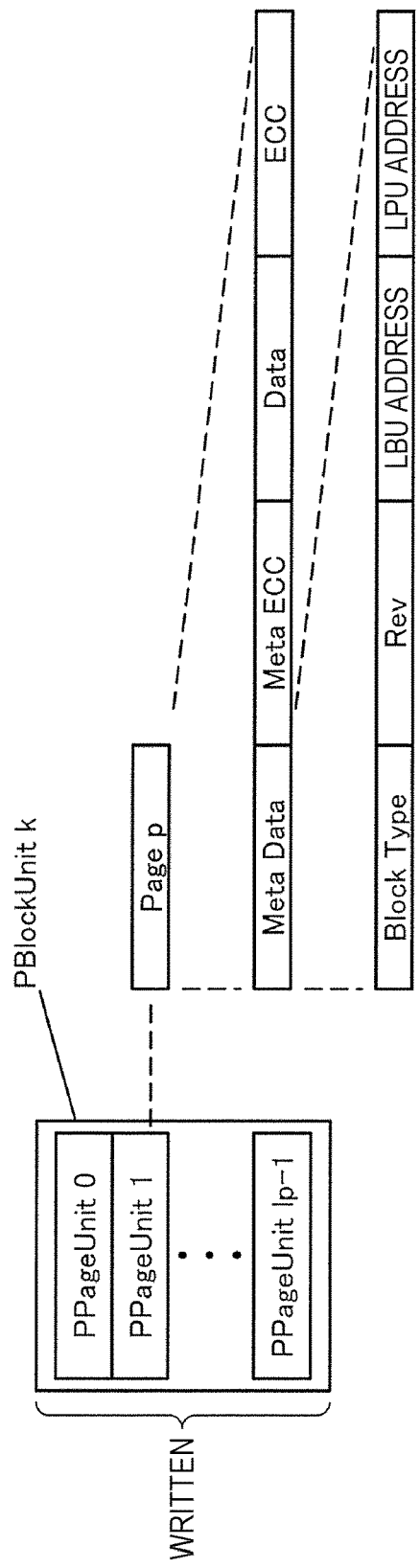
FIG. 7 is a schematic diagram to describe a data structure of data to which P block unit management has been performed.

(1) Data Structure of Data to which the P Block Unit Management has been Performed FIG. 7 indicates the physical block unit holding data to which the P block unit management has been performed. The P block unit management can be performed when a specific L block unit is filled with data from zero offset to the end and all the data in the L block unit is held in the same P block unit. Each physical page included in the P block unit has metadata, error correcting code (ECC) information to the metadata, user data, and ECC information to the user data as indicated in FIG. 7. The metadata includes a block type indicating that the P block unit management is performed, a revision indicating a generation of the P block unit, and an L block unit address and an L page unit address corresponding to those of the P block unit. According to a property of the above-mentioned P block unit management, the L block unit addresses of all the physical pages in the P block unit become the same and the L page unit address becomes the same as P page unit address to which the P block unit belongs.

Figure 8:
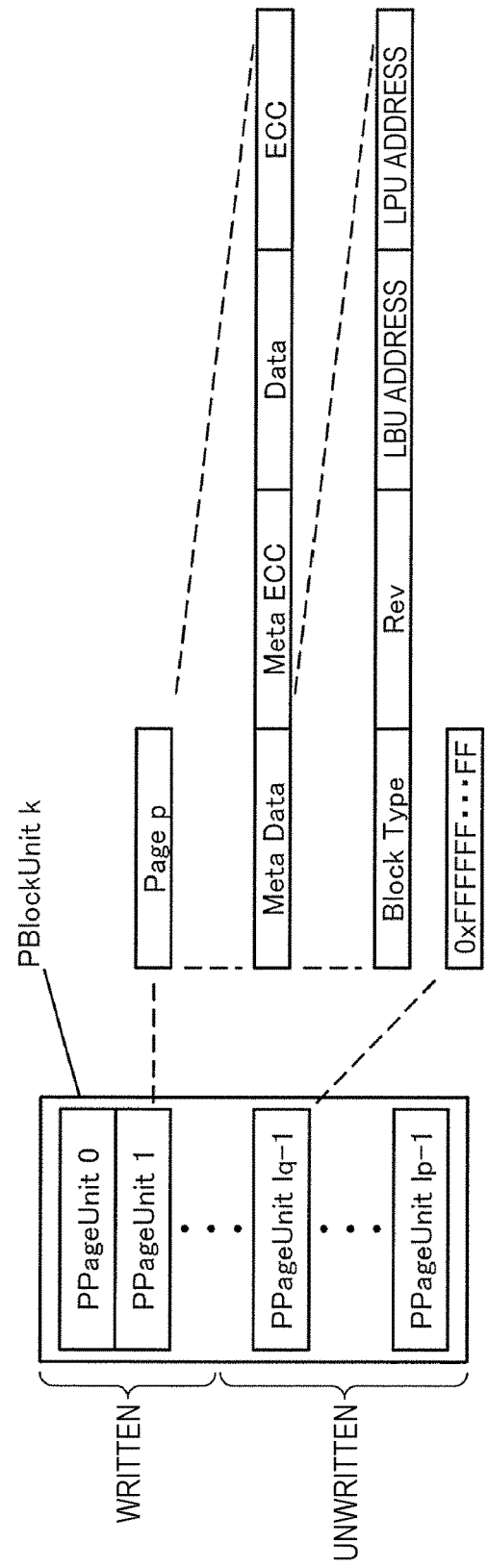
FIG. 8 is a schematic diagram to describe a data structure of data to which sequential management has been performed.

(2) Data Structure of Data to which the Sequential Management has been Performed FIG. 8 indicates a physical block unit holding data to which the sequential management has been performed. The sequential management can be performed when the specific L block unit is filled with data from zero offset to the end and all the data is sequentially held in the same P block unit from zero offset and further data other than the above data does not exist in the same P block unit. Each written physical page included in the P block unit has the metadata, the ECC information to the metadata, the user data, the ECC information to the user data as indicated in FIG. 8. The metadata includes the block type indicating that the sequential management is performed, the revision indicating the generation of the P block unit, and the L block unit address and the L page unit address corresponding to those of the P block unit. According to a property of the above-mentioned sequential management, the L block unit addresses of all the written physical pages in the P block unit become the same and the L page unit address becomes the same as the P page unit address to which the P block unit belongs. Also, an unwritten physical page is filled with one.

Figure 9:
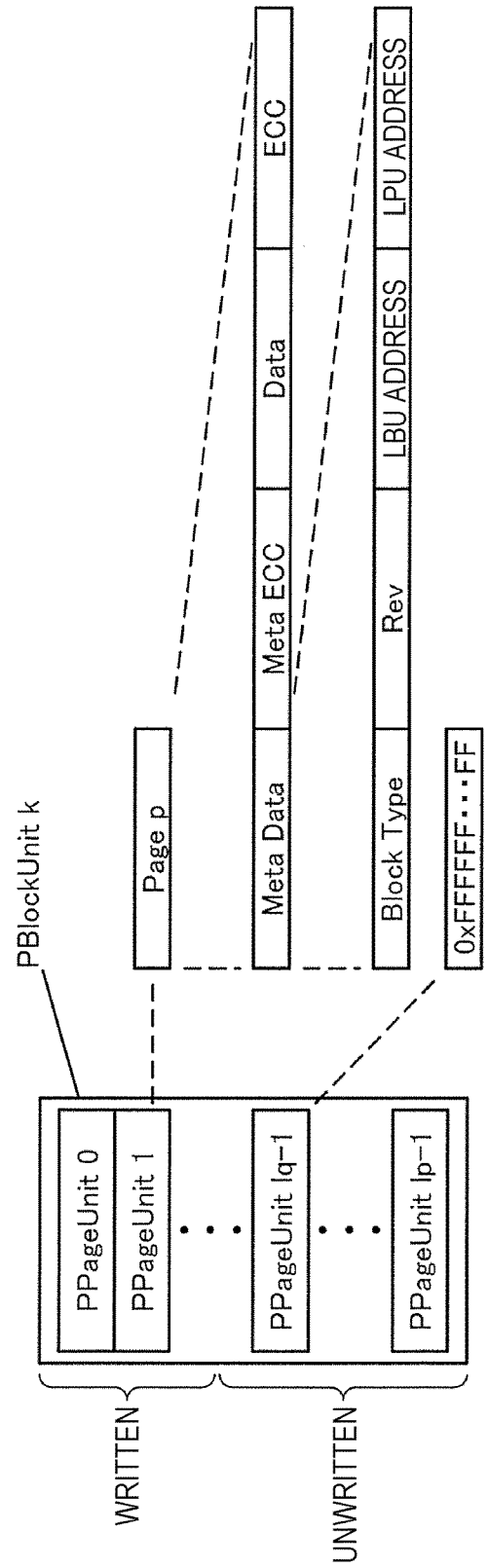
FIG. 9 is a schematic diagram to describe a data structure of data to which P page unit management has been performed.

(3) Data Structure of Data to which the P Page Unit Management has been Performed FIG. 9 indicates a physical block unit holding data to which the P page unit management has been performed. When both the P block unit management and the sequential management cannot be performed, the P page unit management is performed. Each written physical page included in the P block unit has the metadata, the ECC information to the metadata, the user data, the ECC information to the user data as indicated in FIG. 9. The metadata includes the block type indicating that the P page unit management is performed, the revision indicating the generation of the P block unit, and the L block unit address and the L page unit address corresponding to those of the P block unit. Also, the unwritten physical page is filled with one.

Data Structure of the P Block Unit Holding Management Data

Figure 10:
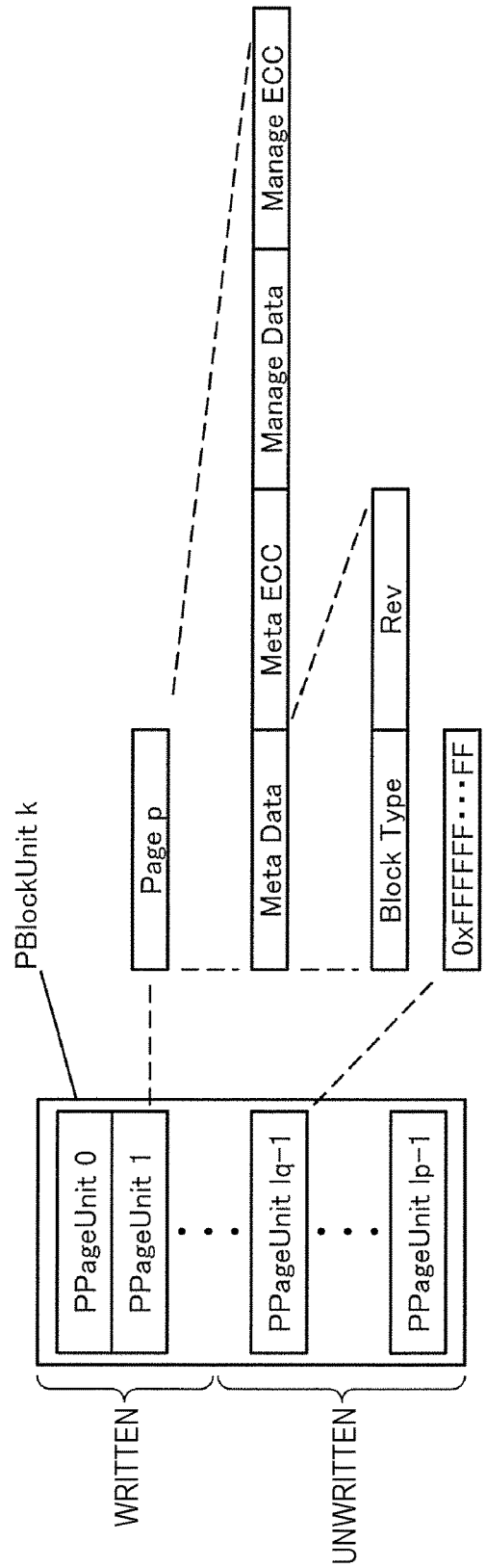
FIG. 10 is a schematic diagram to describe a data structure of a P block unit holding management data.

A data structure to hold data (management data), which manages the above-mentioned user data, in the physical space will be described. FIG. 10 indicates the P block unit holding the management data first. Each physical page included in the P block unit has the metadata, the ECC information to the metadata, the management data, and ECC information to the management data as indicated in FIG. 10. The metadata includes the block type indicating that the metadata is management data and the revision indicating the generation of the P block unit. Configuration methods of management data unit to manage the above-mentioned three kinds of user data will be respectively described below.

(1) Data Structure of the Management Data for the P Block Unit Management

Figure 11:
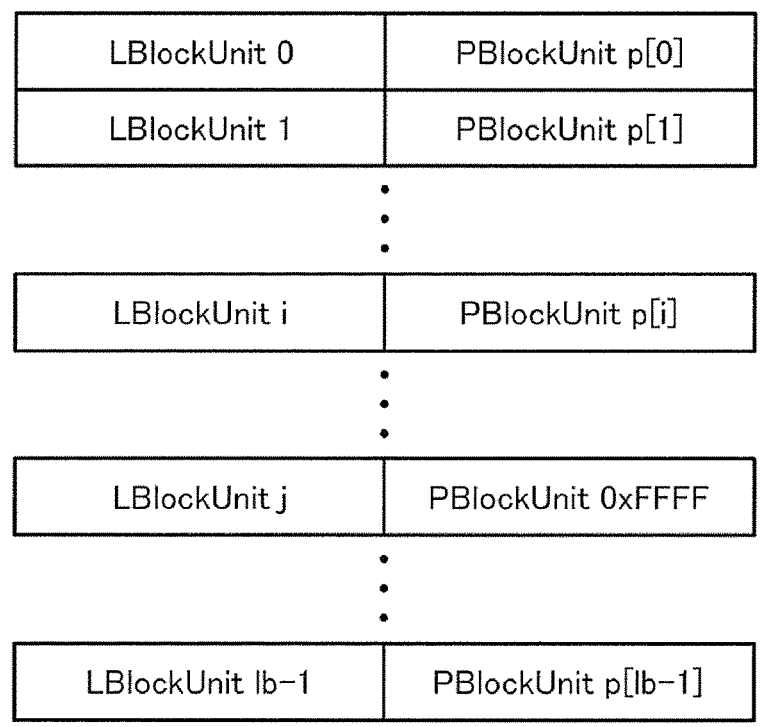
FIG. 11 is a schematic diagram to describe a data structure of the management data for the P block unit management.

FIG. 11 indicates the management data for the P block unit management. The management data includes a pair of the L block unit addresses from zero to lb-1 and the P block unit addresses corresponding to the respective L block unit addresses. When the P block unit management is not performed to one L block unit, the P block unit corresponding to the L block unit stores 0xFFFF (0x represents that it is the hexadecimal notation).

(2) Data Structure of the Management Data for the Sequential Management

FIG. 12 indicates the management data for the sequential management. The management data includes a group of up to e L block unit addresses, the P block unit addresses corresponding to the respective addresses, and the final P page unit addresses to which the sequential write to the address has been performed. Each address of an entry to which the sequential management is not performed by the garbage collection and the like stores the 0xFFFF.

(3) Data Structure of the Management Data for the P Page Unit Management

Figure 13:
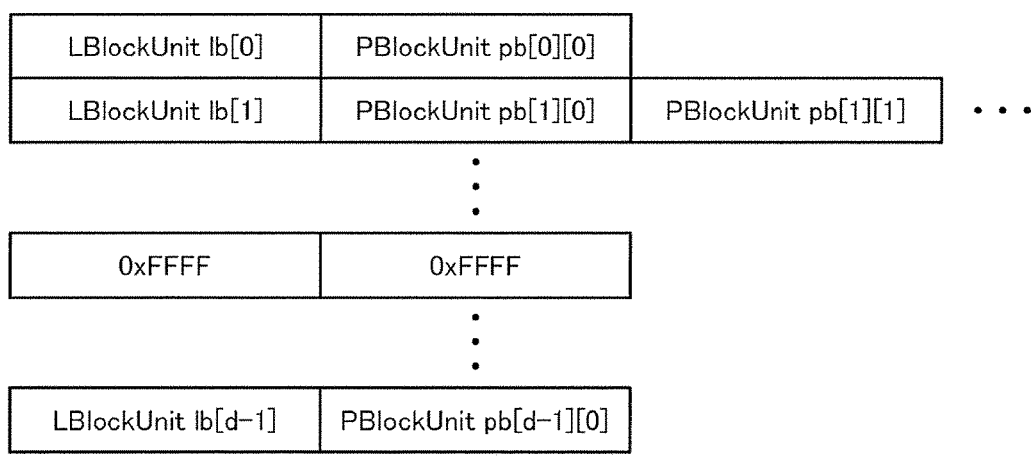
FIG. 13 is a schematic diagram to describe a data structure of first management data for the P page unit management.

FIGS. 13 and 14 indicate the management data for the P page unit management. The management data is divided into two kinds of data. First management data includes a pair of the L block unit addresses and rows of the P block unit addresses corresponding to the respective L block unit addresses (note that the P block unit holding the data of the single L block unit address may be plural in the P page unit management). The maximum number of the L block unit addresses is d. Each address of the entry to which the P page unit management is not performed by the garbage collection and the like stores the 0xFFFF. Second management data includes a group of the L page unit addresses belonging to the same L block unit, the P block unit addresses corresponding to the respective addresses, and the P page unit addresses corresponding to the addresses (one management data is generated for each L block unit respectively managed by using the first management data). Each address of the entry having no data stores the 0xFFFF.

Limitation in the Number of the Block Units in Each Data Structure and the Garbage Collection A reason will be described why the numbers of the maximum block unit addresses which can be managed are limited to e and d in (2) and (3) described above, respectively. In the data to which the P block unit management has been performed, a write amount in the logical space almost coincides with a consumption amount of the physical space because the L block unit corresponds to the P block unit one to one and each block unit is filled with data (since the management data is necessary, the write amount does not perfectly coincide with the consumption amount).

However, in the sequential management and the P page unit management, even when the write amount in the logical space does not reach the P block unit size, one P block unit is secured. That is, the consumption amount in the physical space becomes larger than the write amount in the logical space. A maximum ratio of the write amount and the consumption amount is about (L block unit size/L sector size).

Therefore, in order to ensure that all the data is held in the flash memory regardless of the way to use the logical space by the host device, it is necessary to limit the number of the P block units to which the sequential management and the P page unit management can be performed according to the ensured region size. This is the reason of the limitation in (2) and (3) described above.

When the entry of the management data reaches the limit, and further, when the write smaller than the P block unit size is performed, it is necessary to perform the operation to promote the entry which has already been generated to the P block unit management. This operation is called a garbage collection. A purpose of the present disclosure is to reduce a frequency of the garbage collection by adding the sequential management to a general flash memory controller including only the P block unit management and the P page unit management. The specific content will be described in "Algorithm" below.

"Algorithm"

An algorithm for performing the write by using the data structure described above will be described. The overall flow of the write processing will be described with reference to the flowchart in FIG. 15.

Step ST1: The flash memory device 1 receives a write command from the host device 11.

Step ST2: The P block unit group of the write destinations is obtained by using the management data from the logical address of the write determination.

Step ST3: It is determined whether the obtained P block unit group is consistent with a sequential management registration command in the past in a case of a control method using the sequential management registration command (determination methods 2 and 3 to be described below).

Step ST4: The procedure is terminated while the write command is not received when the P block unit group is not consistent with the sequential management registration command in the past.

Step ST5: One unwritten P block unit is taken out from the obtained P block unit group when the P block unit group is consistent with the sequential management registration command in the past or in a case of the control method not using the sequential management registration command (determination method 1 to be described below).

Step ST6: The write processing in the P block unit is performed.

Step ST7: It is determined whether the write of all the data has been completed. When it is determined that the write all the data has not been completed, the procedure returns to step ST5. Then, the write processing in the P block unit is performed.

Step ST8: The procedure is terminated when it is determined in step ST7 that the write of all the data has been completed.

The determination of consistency with the sequential management registration command will be described below.

Figure 16:
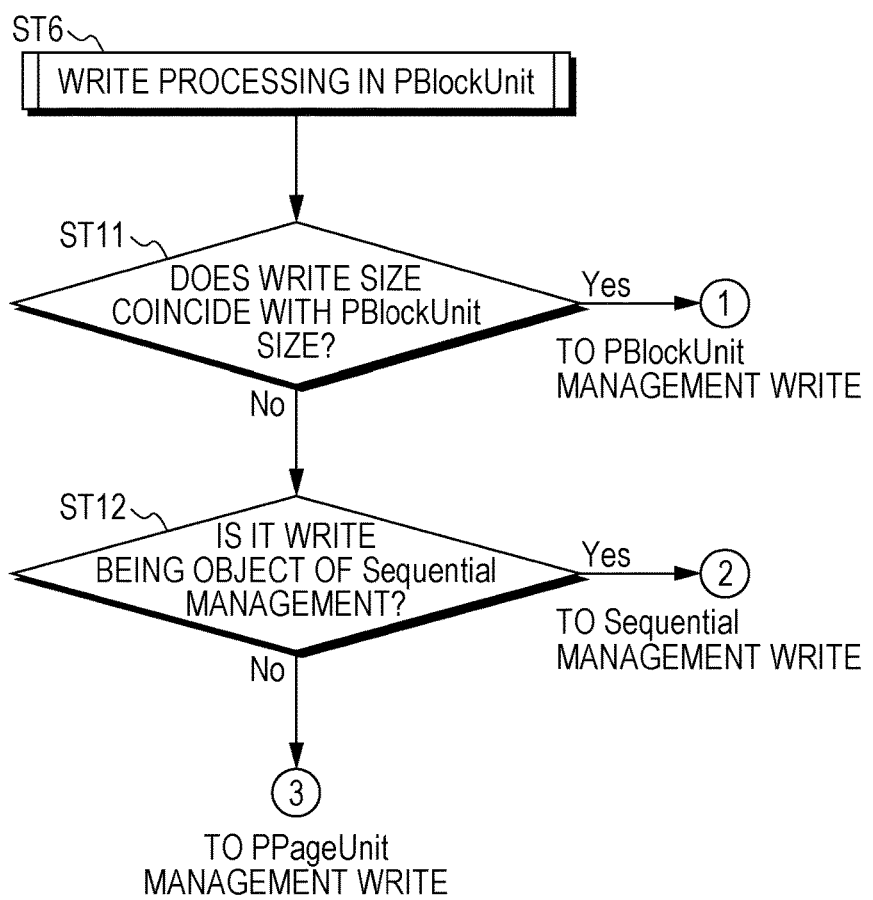
FIG. 16 is a flowchart to describe the write in the P block unit.

FIG. 16 is a flowchart indicating a content of the write in the P block unit. The write in the P block unit is divided into three kinds, that is, a P block unit management write, a sequential write, and a P page unit management write.

Step ST11: It is determined whether the write size coincides with the P block unit size. In a case where the write size coincides with the P block unit size, the P block unit management write is performed.

Step ST12: It is determined whether the write is the object of the sequential management when it is determined in step ST11 that the write size does not coincide with the P block unit size. The determination method will be described below. When it has been determined that the write is the object of the sequential management, the sequential management write is performed. In a case other than the above, the P page unit management write is performed.

In one embodiment of the present disclosure, three kinds of object determination methods for the sequential write will be proposed. Each of these methods has specific merits and demerits. Thus, it is preferable to use a suitable method among three methods according to the purpose of control.

Determination Method 1

Figure 17:
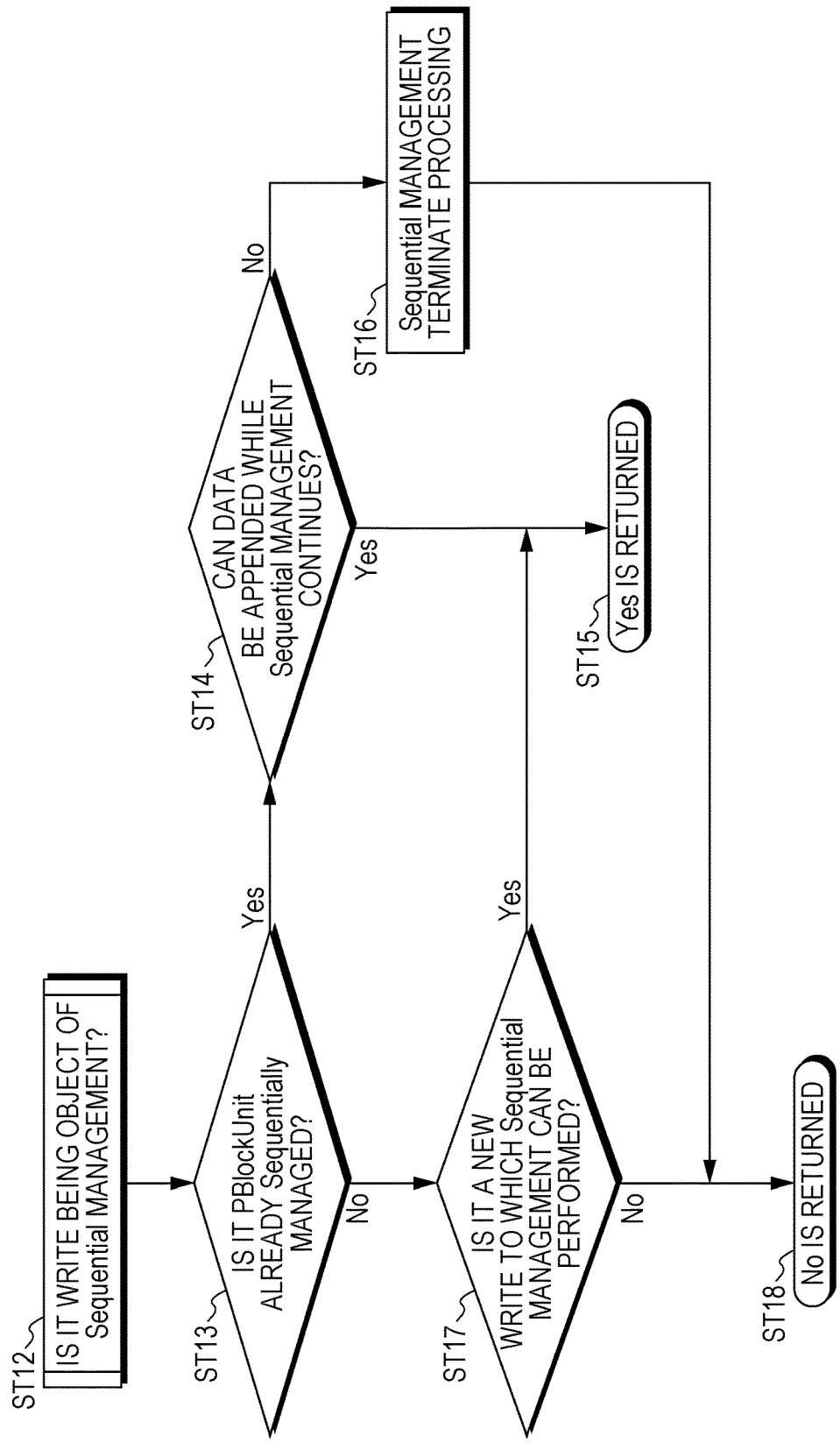
FIG. 17 is a flowchart to describe a method for determining an object to which sequential write is performed by the flash memory.

This is a method in which the flash memory device 1 automatically determines. FIG. 17 is a flowchart indicating a flow of this method.

Step ST13: It is determined whether the P block unit to be written has already been sequentially managed according to a management table.

Step ST14: It is determined whether the data can be sequentially appended in the P block unit when it is determined in step ST13 that the P block unit has been managed. The determination method has arbitrariness according to the implementation, and, for example, a determination can be considered that appending is available when the write has begun from the physical page next to the final written physical page.

Step ST15: It is determined that the P block unit is the sequential management write object when the determination result in ST14 indicates that the data can be appended, and "Yes" is returned.

Step ST16: Termination processing of the sequential management is performed when it is determined in step ST14 that the data cannot be appended. The termination processing is to demote the P block unit to be written to the P page unit management. That is, the entry of the P block unit is erased from a sequential management table, and a new entry of the P block unit is generated in a P page unit management table. Here, when there is no free space in the P page unit management table, a P page unit management block is promoted to the P block unit management by using the garbage collection so as to generate the free space. A method of the garbage collection will be described below.

Step ST18: When it has been determined that the write is not the sequential management write object, "No" is returned.

Step ST17: It is determined whether the write is a new write which can be sequentially managed when the P block unit to be written has not been sequentially managed yet. The determination method has arbitrariness according to the implementation, and a determination can be considered that the sequential management can be performed to the new write of a size equal to or larger than ¼ of the P block unit size, for example.

When the sequential management can be performed, it is determined that the write is the object of the sequential management write. Then, the procedure proceeds to step ST15, and "Yes" is returned. When the sequential management cannot be performed, it is determined that the write is not the object of the sequential management write. Then, the procedure proceeds to step ST18, and "No" is returned.

Determination Method 2

This is a method in which a host clearly indicates the sequentiality of the write. This method is divided into two kinds according to whether the host device manages the sequential management table or not. A method in which the host device does not manage the table is referred to as a method 2, and a method in which the host device manages the table is referred to as a method 3. The method 2 will be described first.

In the method 2, the L block unit is registered in the table for the sequential management registration command by the sequential management registration command before the sequential write. FIG. 18 indicates the management table. The table is held with the same configuration as the table described in a section of the management table of the data structure (refer to FIG. 10). The management table indicates whether the respective L block units from zero to lb-1 are registered by the sequential management registration command. As entries respectively corresponding to the status, one is stored when the L block unit is registered by the sequential management registration command, and zero is stored and when the L block unit is not registered.

Figure 19:
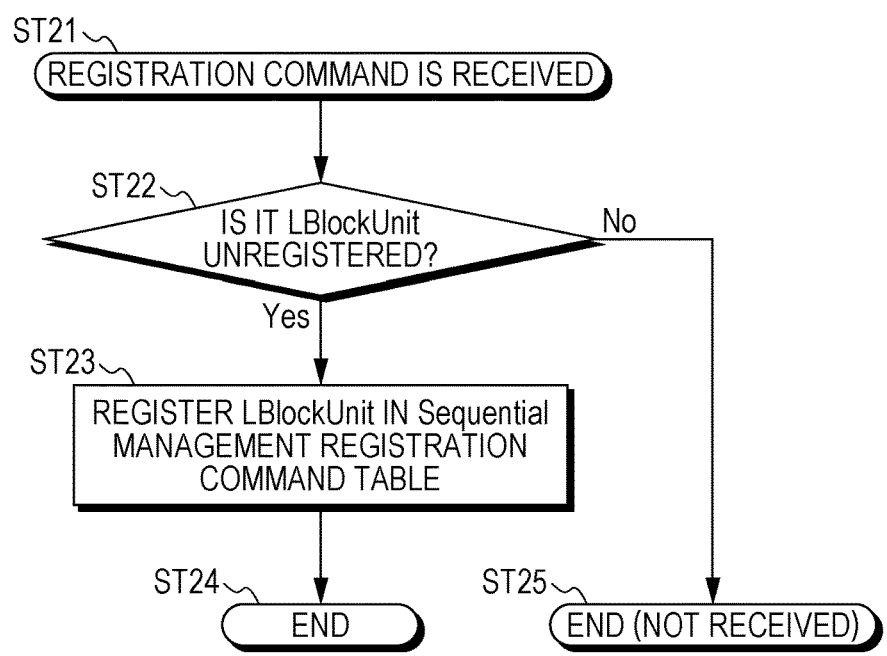
FIG. 19 is a flowchart of processing of the sequential management registration command.

FIG. 19 is a flowchart of processing of the sequential management registration command.

Step ST21: The flash memory device 1 receives a registration command from the host device 11.

Step ST22: The registration command uses the L block unit as a parameter, and it is determined whether the L block unit is unregistered.

Step ST23: When the L block unit is unregistered, the L block unit is registered in the table for the sequential management registration command. The procedure is terminated in step ST24.

Step ST25: When the L block unit has been registered, the procedure is terminated while the command is not received.

Figure 20:
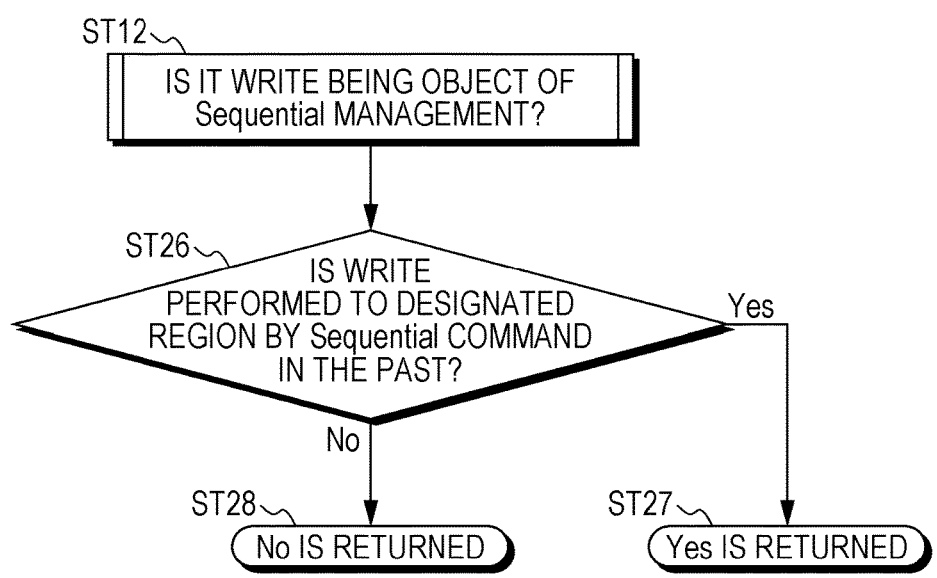
FIG. 20 is a flowchart of processing of a method in which a host clearly indicates sequentiality of the write and in a case where a host device does not manage the table for the sequential management registration command.

FIG. 20 is a flowchart indicating processing for the determination of the method 2.

Step ST26: It is determined whether the L block unit has been registered while scanning the table for the sequential management registration command.

Step ST27: When the L block unit has been registered, it is determined that the write is the object of the sequential management write. Then, the determination result indicating that the write is the object of the sequential management write is returned.

Step ST28: When the L block unit has not been registered, it is determined that the write is not the object of the sequential management write. Then, the result of "No" is returned.

Figure 15:
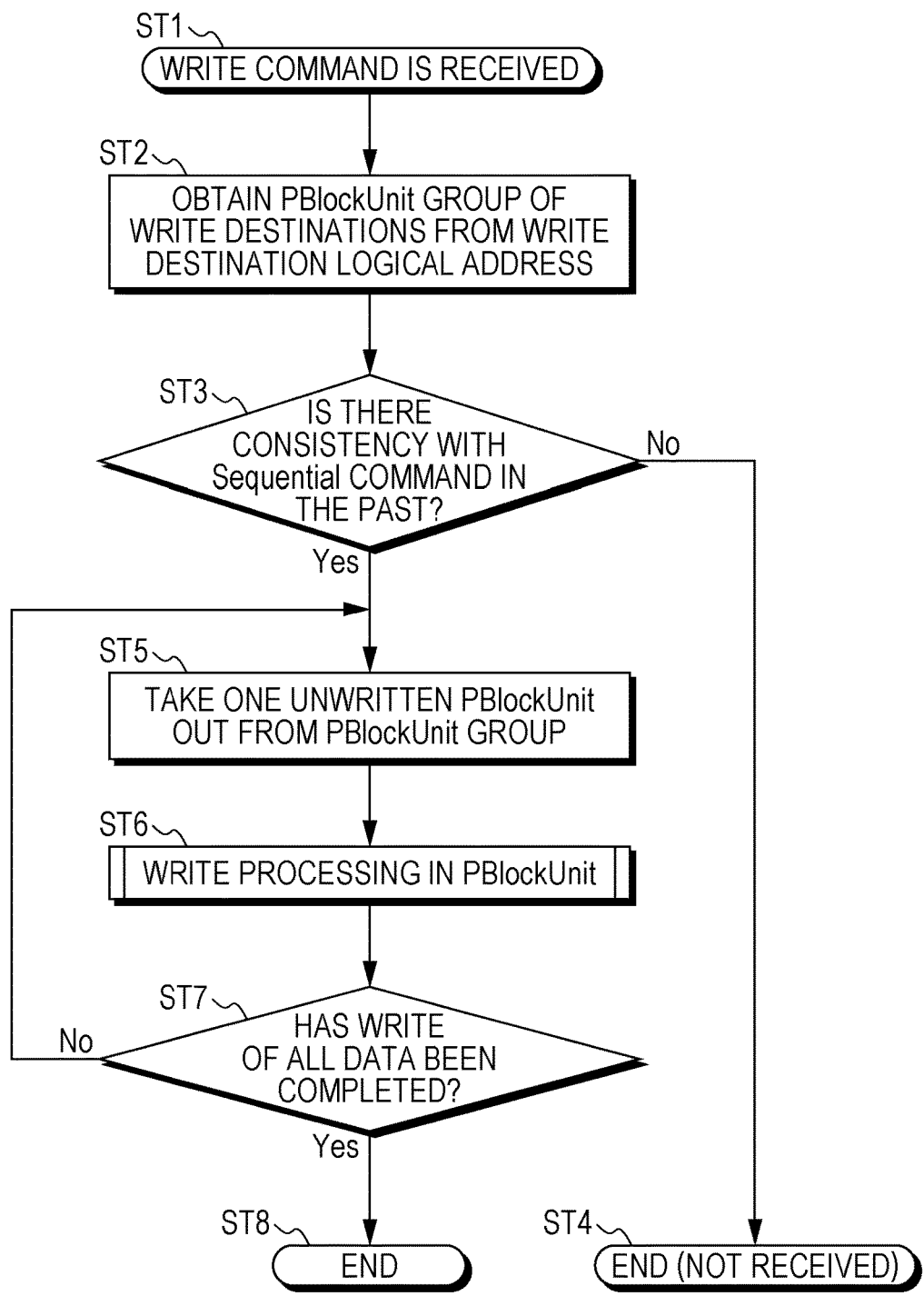
FIG. 15 is a flowchart of an overall flow of write processing.
Figure 21:
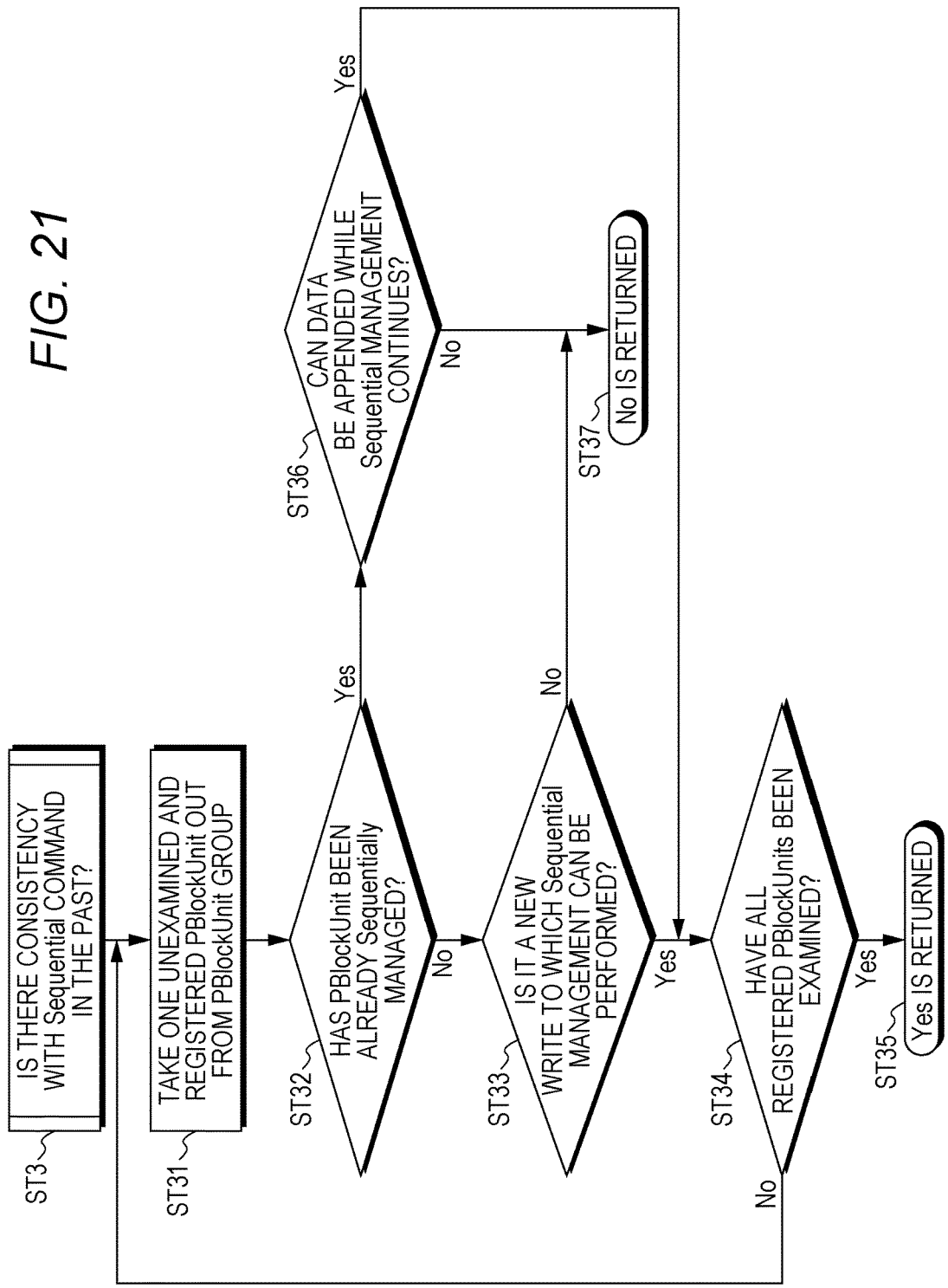
FIG. 21 is a flowchart of processing for determining whether a write command is consistent with the sequential management registration command in the past.

When the sequential management registration command is used, it is necessary to determine for each write command whether the write is consistent with the sequential management registration command in the past as described regarding step ST3 in FIG. 15. FIG. 21 is a flowchart of the determination.

Step ST31: One P block unit corresponding to the L block unit registered in the table for the sequential management registration command is taken out from the P block unit group to be written.

Step ST32: It is determined whether the P block unit has been already sequentially managed.

Step ST33: It is determined whether the write is the new write which can be sequentially managed when the determination result is "No" in step ST32.

Step ST34: It is determined whether examination on all the registered P block units has been completed.

Step ST35: When it is determined that the examination has been completed, it is determined that there is the consistency. Then, "Yes" is returned.

Step ST36: When it is determined in step ST32 that the P block unit has been already sequentially managed, it is determined whether the data can be appended while the sequential management continues. When it is determined that the data can be appended, the procedure proceeds to step ST34.

Step ST37: When it is determined in step ST33 that the write is not the new write which can be sequentially managed, it is determined that there is no consistency. Then, "No" is returned. Similarly, when it is determined in step ST36 that the data cannot be appended while the sequential management continues, it is determined that there is no consistency. Then, "No" is returned.

In this way, the P block unit corresponding to the L block unit registered in the table for the sequential management registration command is taken one by one from the P block unit group to be written, and it is determined whether the sequential management can be continuously performed to the obtained P block unit. It is determined that there is consistency when the sequential management can be continuously performed to all the examination objects, and it is determined that there is no consistency when the sequential management cannot be continuously performed to all the examination objects.

Determination Method 3

Figure 22:
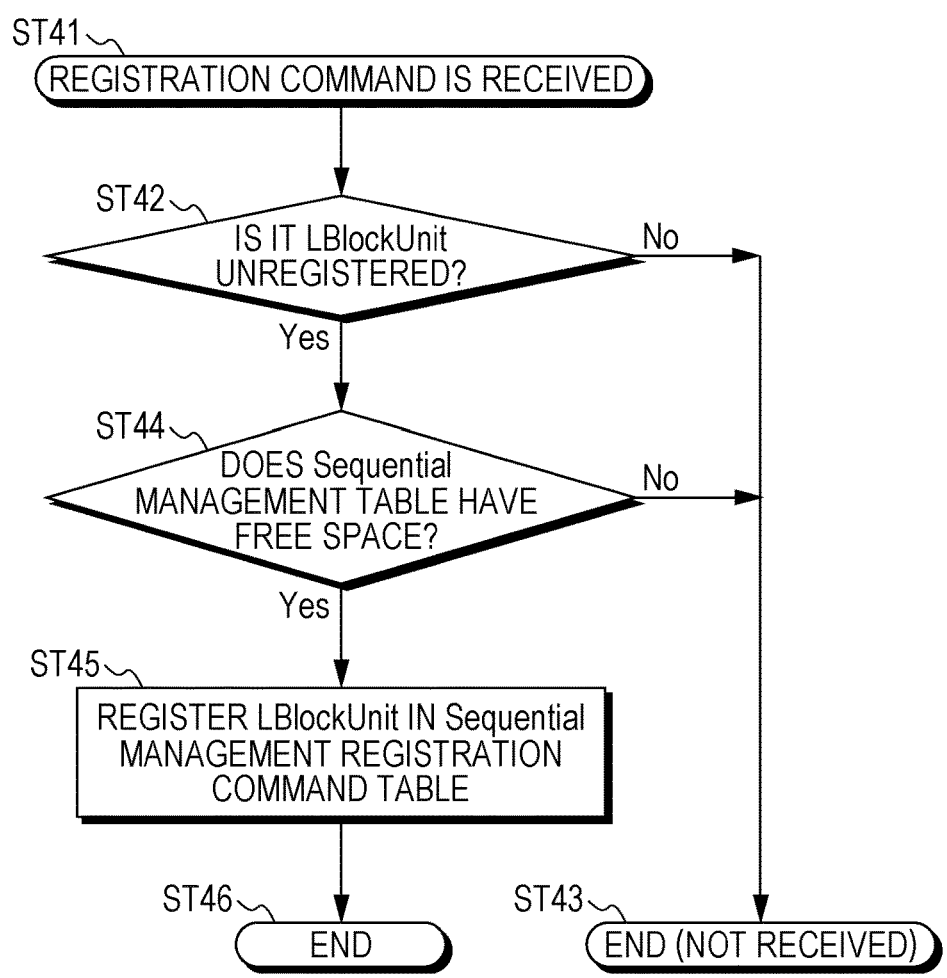
FIG. 22 is a flowchart of processing of the sequential management registration command in a method in which the host device manages the table for the sequential management registration command.

This is one of the methods in which the host clearly indicates the sequentiality of the write, and this is a method in which the host device manages the sequential management table. A difference between the determination methods 2 and 3 is that the number of the entries which can be registered in the table for the sequential management registration command is limited to e entries indicated in FIG. 12. When the sequential management registration command is issued at the time when the e entries has already existed, the command is not received. FIG. 22 is a flowchart of processing of the sequential management registration command in the determination method 3.

Step ST41: The registration command is received.

Step ST42: It is determined whether the L block unit is unregistered.

Step ST43: When the L block unit is not unregistered, the command is not received.

Step ST44: When the L block unit is unregistered, it is examined whether the sequential management table has the free space. When it is determined that there is no free space, the command is not received (step ST43).

Step ST45: When it is determined in step ST44 that the sequential management table has the free space, the L block unit is registered in a sequential management registration command table.

Step ST46: Processing to the registration command is terminated.

Figure 23:
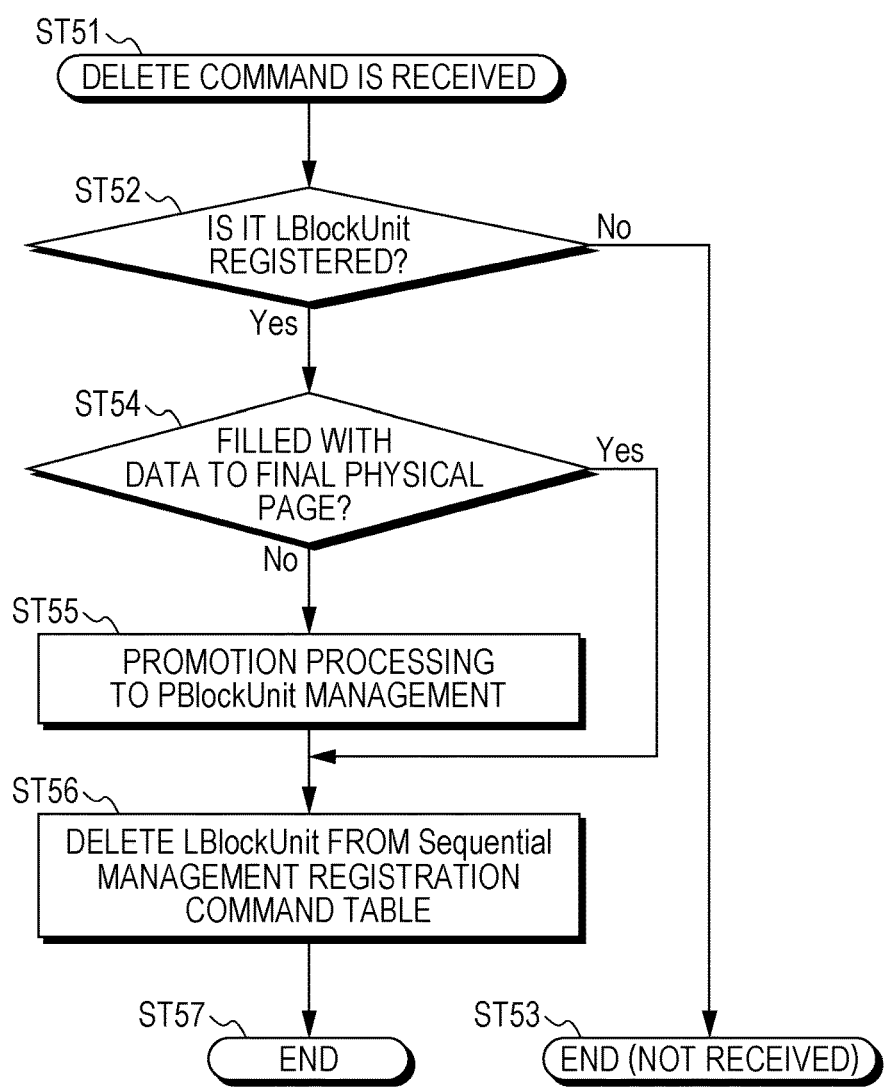
FIG. 23 is a flowchart of processing of a sequential management registration delete command in a method in which the host device manages the table for the sequential management registration command.

When this method is used, a sequential management registration delete command is further provided. FIG. 23 is a flowchart of a flow of processing regarding a delete command.

Step ST51: The delete command is received.

Step ST52: It is determined whether the L block unit has already been registered.

Step ST53: When the L block unit has not already been registered, the command is not received.

Step ST54: It is examined whether the L block unit is filled with the data (written) to the final physical page.

Step ST55: When it is determined that the L block unit is not filled with the data to the final physical page, the L block unit is promoted to the P block unit management. That is, the garbage collection to promote is necessary.

Step ST56: When it is determined in step ST54 that the L block unit is filled with the data to the final physical page or after the processing of step ST55, the L block unit is deleted from the sequential management registration command table.

Step ST57: Processing to the registration delete command is terminated.

P Block Unit Management Write

Figure 24:
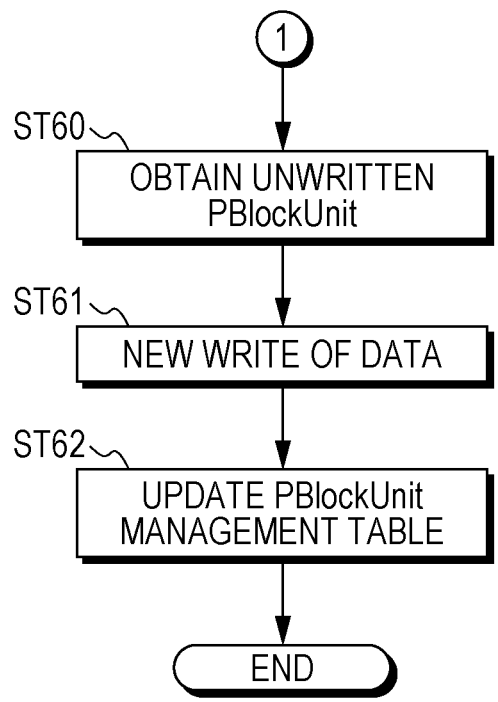
FIG. 24 is a flowchart of processing of a P block unit management write.

By using the above-mentioned determination methods 1 to 3, it can be determined which one of the P block unit management write, the sequential write, or the P page unit management write is the object write. These three kinds of writes will be described below. A method of the P block unit management write will be described first. FIG. 24 is a flowchart of processing of the P block unit management write.

Step ST60: In the P block unit management write, an unwritten P block unit is newly obtained.

Step ST61: Data is written to the obtained P block unit.

Step ST62: When the write is finished, the P block unit to be written is registered in a P block unit management table, and the procedure is terminated.

Sequential Management Write

Figure 25:
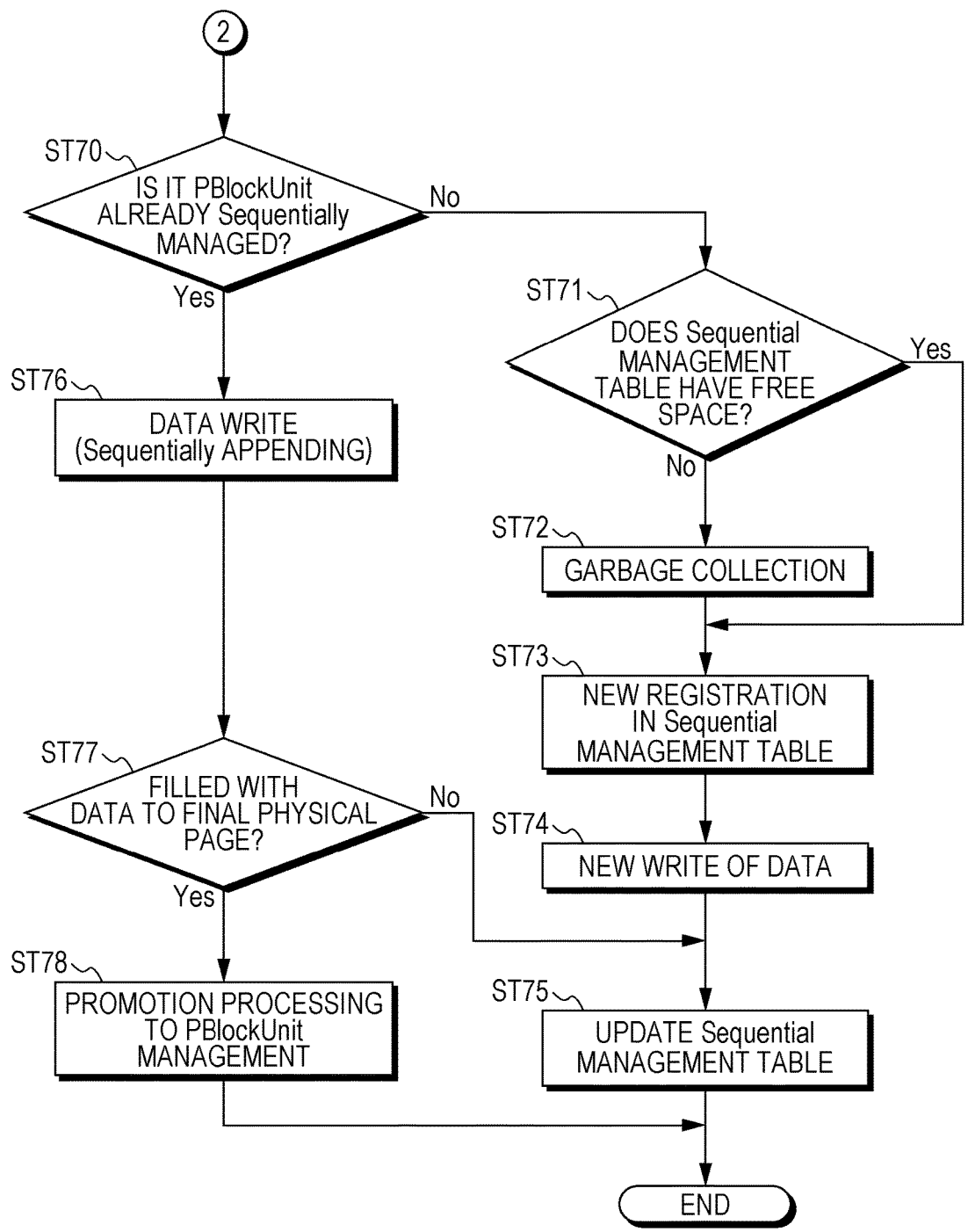
FIG. 25 is a flowchart of processing of a sequential management write.

FIG. 25 is a flowchart of a flow of processing of the sequential management write.

Step ST70: It is determined whether the P block unit has already been sequentially managed. That is, it is determined whether the write is a new write or append write.

Step ST71: When the write is the new write, the free space is searched by scanning the sequential management table.

Step ST72: When there is no free space, a sequential management block is promoted to the P block unit management by using the garbage collection so as to generate the free space. In a case where the method 3 is used, the free space certainly exists at this stage because the write having no free space is removed at the stage of the command.

Step ST73: A new P block unit is registered in a free entry obtained by the above operation.

Step ST74: Data is newly written.

Step ST75: The sequential management table is updated when the write is finished, and the procedure is terminated.

Step ST76: When it has been determined in step ST70 that the write is the append write, the data is sequentially appended. The sequential management table is updated.

Step ST77: It is determined whether the P block unit has been filled with the data to the final physical page.

Step ST78: When it is determined that the P block unit has been filled with the data to the final physical page, promotion processing to the P block unit management is performed. Then, the procedure is terminated. That is, the entry in the sequential management table is deleted, and the written P block unit is registered in the P block unit management table.

When it is determined in step ST77 that the P block unit has not been filled with the data to the final physical page, the procedure proceeds to step ST75. The sequential management table is updated, and the procedure is terminated.

P Page Unit Management Write

Figure 26:
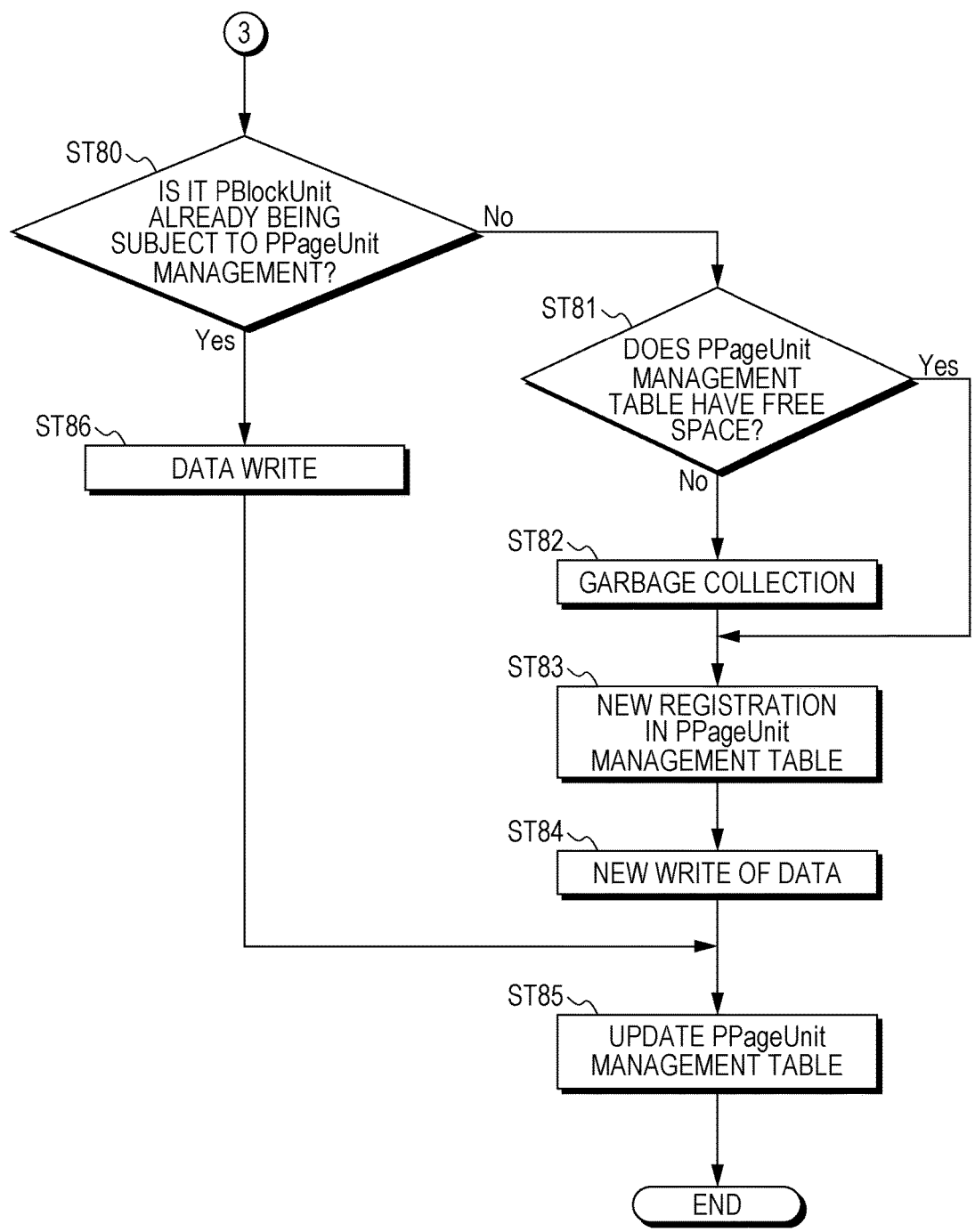
FIG. 26 is a flowchart of processing of a P page unit management write.

FIG. 26 is a flowchart of a flow of processing of the P page unit management write.

Step ST80: Regarding this write, it is determined first whether the P page unit management has been already performed to the write determination.

Step ST81: When the P page unit management is not performed, the free space is searched by scanning the P page unit management table.

Step ST82: When there is no free space, a P page unit management block is promoted to the P block unit management by using the garbage collection, and the free space is generated.

Step ST83: A new P block unit is registered in the free entry.

Step ST84: Data is newly written.

Step ST85: The P page unit management table is updated when the write is finished, and the procedure is terminated.

Step ST86: When the write has already been managed, the data is further written. Then, the P page unit management table is updated, and the procedure is terminated.

Garbage Collection

The garbage collection will be described. The garbage collection is an operation to promote the data to which the sequential management and the P page unit management are performed to the P block unit management and generate the free space in the management table of the data. The reason why the operation is necessary has been described in the paragraphs regarding the data structure.

First, the garbage collection for promoting the P page unit management to the P block unit management will be described. First, the L block unit to be promoted is selected from the P page unit management table, and the P block unit group holding the data of the L block unit to be promoted is obtained by scanning each management table. The data corresponding to the L block unit to be promoted is copied from the P block unit group to the new P block unit, and each management table is updated.

Next, the garbage collection for promoting the sequential management to the P block unit management will be described. First, the L block unit to be promoted is selected from the sequential management table, and the P block unit corresponding to the selected L block unit and the written final P page unit are obtained. After that, the P block unit group holding the data in an unwritten region after the written final P page unit is obtained by scanning each management table. The data corresponding to the L block unit to be promoted is copied from the P block unit group obtained by the above operation to a new P block unit, and each management table is updated.

As easily inferred from the configuration of the method, in a case where the L block unit to be promoted is filled with the data (written final P page unit corresponds with the final P page unit of the P block unit), the P block unit to be copied is fixed to one P block unit to which the sequential management is performed. That is, since there is no other P block unit holding the data of the L block unit to be promoted, the garbage collection is not necessary. A purpose of the present disclosure is to reduce the garbage collection according to the property and suppress deterioration of performance.

Comparison of Methods 1 to 3

Differences among the above-mentioned determination methods 1 to 3 will be described. FIG. 27 is a table showing the comparison. A conventional method is a case where the sequential management is not performed in the present disclosure. First, the subject for determining whether the write is sequential is the flash memory device in the method 1, whereas the subject is the host device in the methods 2 and 3.

In the method 2, the host device only resisters the sequential management table, and the flash memory device controls the sequential management table. Whereas in the method 3, the host device also deletes the sequential management table (control of the number of the registrations). That is, in the methods 1 and 2, the subject which can control the sequential management table is only the flash memory device, whereas in the method 3, the host device can also control the sequential management table.

By using any one of the three methods, the garbage collection to the sequential write can be prevented. However, the above is not applied in a case where the sequential write is broken in the middle and in a case where there is no free space in the sequential management table. In both cases, the garbage collection is performed in the method 1. In the method 2, since the write in which the sequentiality may be broken is not received at the stage of the command, the garbage collection in such a case can also be prevented. However, when there is no free space in the sequential management table, the garbage collection is performed. In the method 3, since the write is not received at the stage of the command when there is no free space in the sequential management table, the garbage collection in such a case can also be prevented.

"Effect of the Embodiment"

By using the present disclosure, as long as the write smaller than the P block unit is a sequential access, the speed reduction caused by the garbage collection can be avoided. Therefore, even when the host device continuously writes the data little by little, an access with stable performance can be provided without changing an access pattern. Also, the host device with limited buffer size primarily cannot access by the P block unit. With respect to such a host device, the garbage collection cannot be avoided in a case of the conventional continuous write. However, the access with the stable performance can be provided to the host device by using the present disclosure.

Further, according to the present disclosure, even in a case of an access which is sequential in part, the garbage collection of the sequential part can be suppressed by using the present technique regarding the sequential part. Therefore, the present technique is effective to the access, in which the data and the metadata are alternately written by several numbers of times, specific for a file system. Since a number of file systems typified by a FAT usually performs the write in this access pattern, improvement in performance can be expected by using the present disclosure.

The present disclosure does not limit the number of the P block units, which is sequentially managed, to one. Therefore, the present disclosure can be applied to the point where a plurality of data is alternately and sequentially written. When this is applied, it is considered that it is possible to prevent the deterioration of performance in the metadata write by the control to sequentially write the metadata other than the data.

By using the method 3 of the present disclosure, the host device can partially control the garbage collection of the flash memory device. When this is applied, the control is available in which the garbage collection is selectively avoided by performing sequential specifying to an important write in which it is preferable that the speed reduction certainly does not occur.

To clarify differences between the present disclosure and the conventional method, an example of the write in which the differences appear will be described below. For example, how the conventional method and the present disclosure work relative to the four write methods will be described. A list of the operation examples to be described below is shown in FIG. 28.

"Description of Each Write Method"

Examples 1 to 4 of the write method will be described below. In order to simplify the description, it is assumed that all the writes of the examples 1 to 4 below be the writes to a new P block unit which has not been managed in the past. Also, it is assumed that both the sequential management table and the P page unit management table can hold more than four entries (corresponds to the assumption such that d≥4, e≥4).

Example 1 of Write Method

Figure 29:
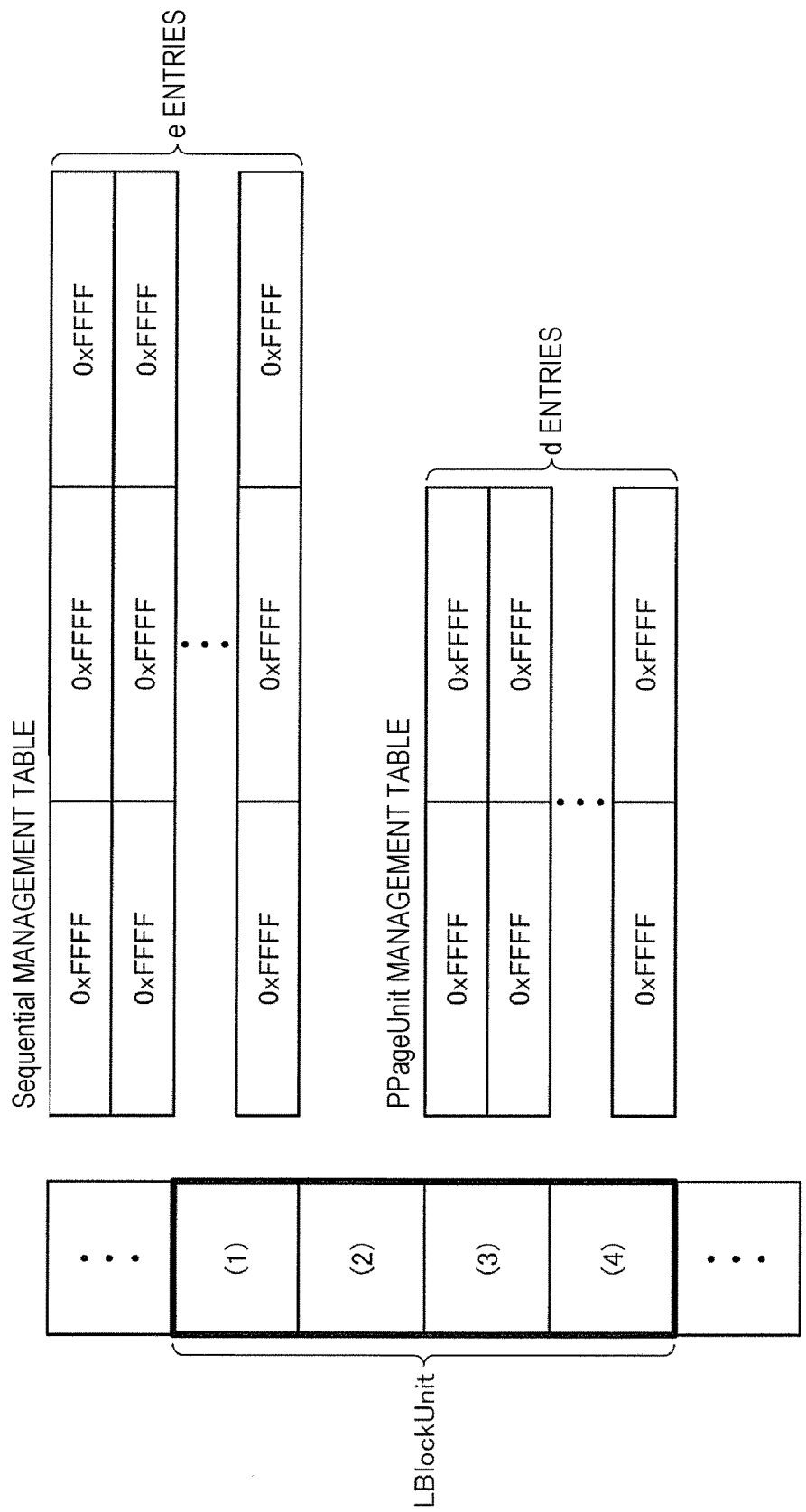
FIG. 29 is a schematic diagram to describe an example 1 of a write method.

FIG. 29 indicates an example 1 of the write method. In the example 1, both the sequential management table (refer to FIG. 12) and the P page unit management table (refer to FIG. 13) are empty. The write of (L block unit/4) size is performed to one L block unit four times in order of (1), (2), (3), and (4).

Example 2 of Write Method

Figure 30:
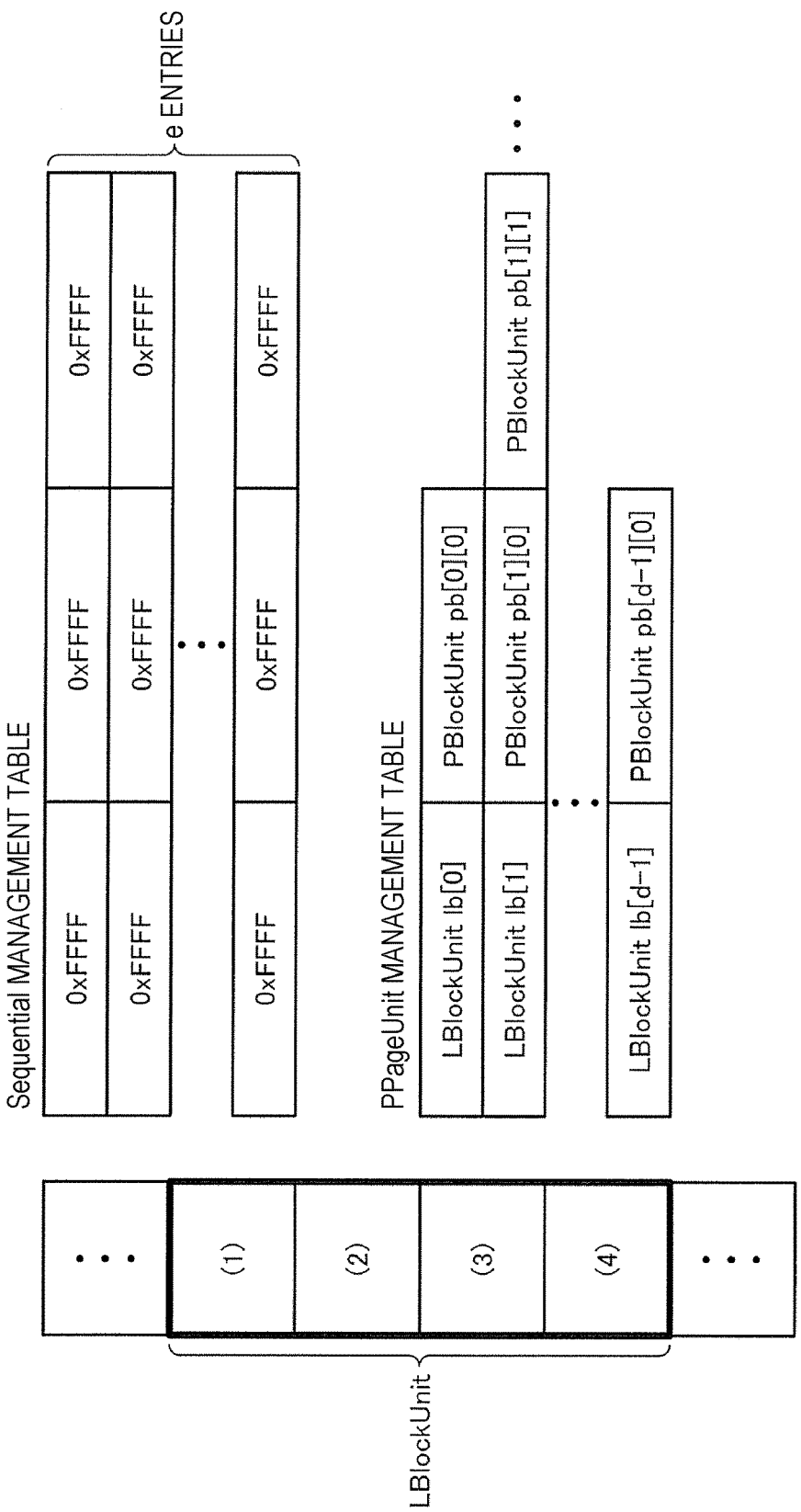
FIG. 30 is a schematic diagram to describe an example 2 of the write method.

FIG. 30 indicates an example 2 of the write method. In the example 2, the sequential management table (refer to FIG. 12) is empty, and the P page unit management table (refer to FIG. 13) is full (no free space). The write of (L block unit/4) size is performed to one L block unit four times in order of (1), (2), (3), and (4).

Example 3 of Write Method

Figure 31:
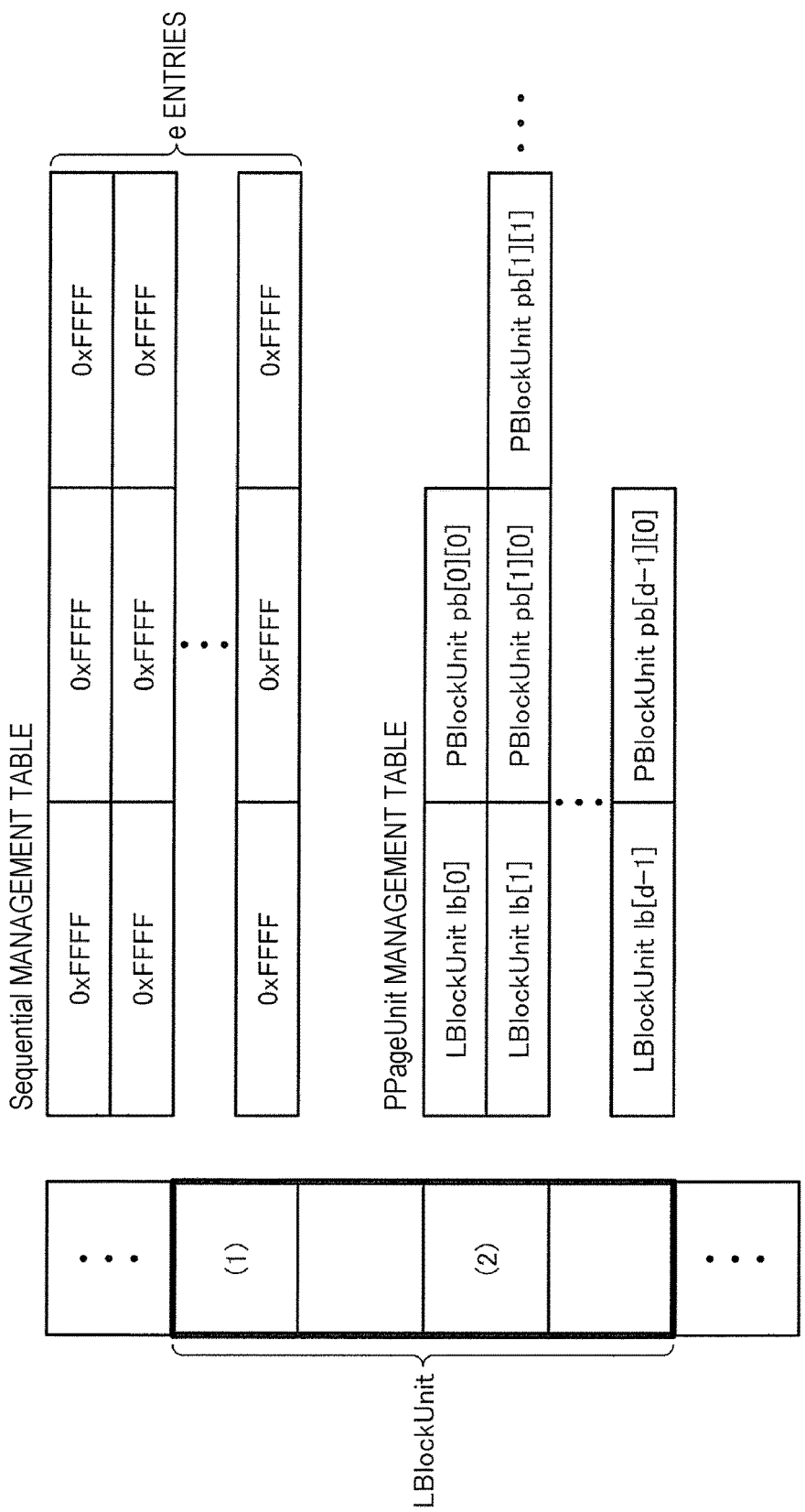
FIG. 31 is a schematic diagram to describe an example 3 of the write method.

FIG. 31 indicates an example 3 of the write method. In the example 3, the sequential management table (refer to FIG. 12) is empty, and the P page unit management table (refer to FIG. 13) is full (no free space). The write of (L block unit/4) size is performed to one L block unit twice in order of (1) and (2). The example 3 is different from the examples 1 and 2 of the write method in that (1) and (2) are not the sequential write.

Example 4 of Write Method

Figure 32:
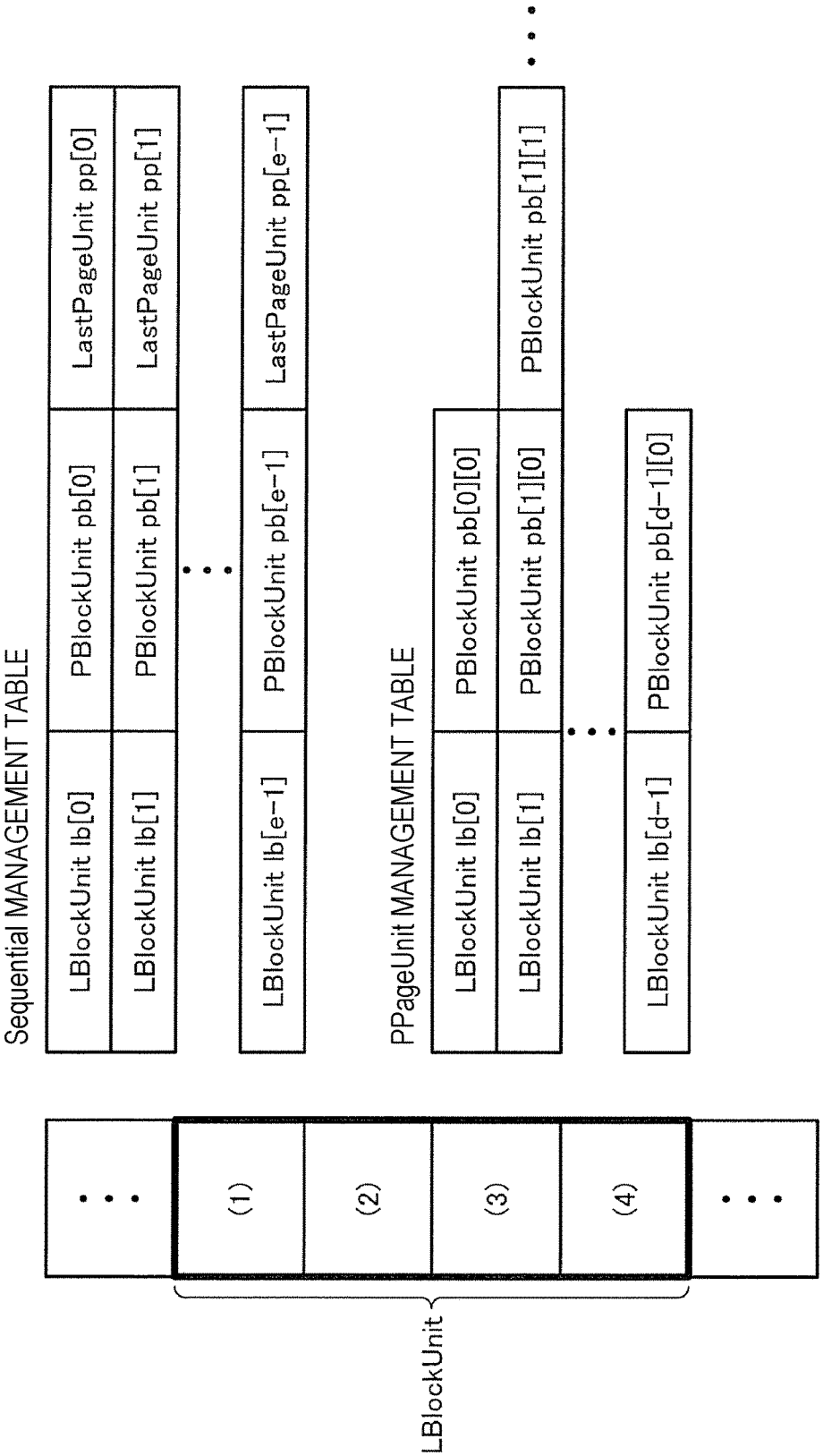
FIG. 32 is a schematic diagram to describe an example 4 of the write method.

FIG. 32 indicates an example 4 of the write method. In the example 4, both the sequential management table (refer to FIG. 12) and the P page unit management table (refer to FIG. 13) are full (no free space). The write of (L block unit/4) size is performed to one L block unit four times in order of (1), (2), (3), and (4).

Description of Operation

Operations in a case where the conventional method and the present techniques are applied to each write method described above will be described.

A Case of Write Method 1
(Conventional Method)

1. When a command of a write (1) is issued, the procedure of the flowchart in FIG. 15 starts. In the conventional method, since the sequential management is not performed, the result of step ST3 which is a first branch (IS THERE CONSISTENCY WITH SEQUENTIAL COMMAND IN THE PAST?) becomes "Yes". The procedure goes through the following operations in FIG. 15, and the procedure proceeds to the write processing in the P block.

2. FIG. 16 is the P block write processing. Since the write (1) is smaller than the P block unit size, the result of step ST11 which is a first branch (DOES WRITE SIZE COINCIDE WITH P BLOCK UNIT SIZE?) is "No". Further, the sequential management is not performed in the conventional method, the result of step ST12 which is a next branch (IS IT WRITE BEING OBJECT OF SEQUENTIAL MANAGEMENT?) is "No". Therefore, the procedure proceeds to the P page unit management write processing of 3.

3. FIG. 26 is the P page unit management write. Since it is assumed that the write (1) be a write to the new P block unit which has not been managed in the past, the result of step ST80 which is a first branch (IS IT P BLOCK UNIT ALREADY BEING SUBJECT TO P PAGE UNIT MANAGEMENT?) is "No". Since the P page unit management table is empty, the result of step ST81 (DOES P PAGE UNIT MANAGEMENT TABLE HAVE FREE SPACE?) is "Yes". The content of the write (1) is registered in the P page unit management table without performing the garbage collection (step ST83), and the procedure goes through the following operations. Then, the write (1) is terminated.

4. When a command of a write (2) is issued, the procedure of the flowchart in FIG. 15 starts again. After that, the operations similar to those of 1 and 2 described above are performed, and the procedure proceeds to the P page unit management write in FIG. 26. Whether the write (2) is performed to the same P block unit as the write (1) depends on an implementation method of the conventional method. When the write (2) is performed, the result of step ST80 which is the first branch (IS IT P BLOCK UNIT ALREADY BEING SUBJECT TO P PAGE UNIT MANAGEMENT?) is "Yes". In this case, the write is additionally performed to the same P block unit as the write (1), and the procedure goes through the following operations. Then, the write (1) is terminated.

When the write (2) is not performed to the same P block unit as the write (1), the result of step ST80 which is the first branch (IS IT P BLOCK UNIT ALREADY BEING SUBJECT TO P PAGE UNIT MANAGEMENT?) is "No". Since it is assumed that (d≥4), the result of step ST81 (DOES P PAGE UNIT MANAGEMENT TABLE HAVE FREE SPACE?) is "Yes". The content of the write (2) is registered in the P page unit management table without performing the garbage collection (step ST83), and the procedure goes through the following operations. Then, the write (2) is terminated.

5. When a command of a write (3) is issued, the procedure of the flowchart in FIG. 15 starts again. After that, the operation similar to that of 4 described above is performed, and the write (3) is terminated.

6. When a command of a write (4) is issued, the procedure of the flowchart in FIG. 15 starts again. After that, the operation similar to that of 4 described above is performed, and the write (4) is terminated.

According to the above, in the conventional method, one to four P page unit management tables are consumed according to the control method, and the write is terminated.

(Technique 1)

1. When the command of the write (1) is issued, the procedure of the flowchart in FIG. 15 starts. In a technique 1, since the sequential management using the sequential command is not performed, the result of step ST3 which is the first branch (IS THERE CONSISTENCY WITH SEQUENTIAL COMMAND IN THE PAST?) becomes "Yes". The procedure goes through the following operations in FIG. 15, and the procedure proceeds to the write processing in the P block (step ST6).

2. FIG. 16 is the P block write processing. Since the write (1) is smaller than the P block unit size, the result of step ST11 which is the first branch (DOES WRITE SIZE COINCIDE WITH P BLOCK UNIT SIZE?) is "No". In order to obtain the determination result of step ST12 which is the next branch (IS IT WRITE BEING OBJECT OF SEQUENTIAL MANAGEMENT?), the procedure of the flowchart in FIG. 17 starts.

3. Since it is assumed that the write (1) be the write to the new P block unit which has not been managed in the past, the result of step ST13 which is the first branch (IS IT P BLOCK UNIT ALREADY SEQUENTIALLY MANAGED?) is "No". The determination method of step ST17 which is the next branch (IS IT A NEW WRITE TO WHICH SEQUENTIAL MANAGEMENT CAN BE PERFORMED?) has the arbitrariness according to the implementation. The exemplified determination method (It is assumed that a new write which is equal to or larger than ¼ of the P block unit size be sequential management object) is used. Therefore, the determination result of step ST17 of this branch is "Yes". Therefore, "Yes" is finally obtained, and the procedure returns to FIG. 16. Accordingly, the result of step ST12 in FIG. 16 (IS IT WRITE BEING OBJECT OF SEQUENTIAL MANAGEMENT?) becomes "Yes", and the procedure shifts to the sequential management write.

4. The flowchart in FIG. 25 is a flow of the sequential management write. Since it is assumed that the write (1) be the write to the new P block unit which has not been managed in the past, the result of step ST70 which is a first branch (IS IT P BLOCK UNIT ALREADY SEQUENTIALLY MANAGED?) is "No". Since the sequential management table is empty, the result of step ST71 (DOES SEQUENTIAL MANAGEMENT TABLE HAVE FREE SPACE?) is "Yes". The content of the write (1) is registered in the sequential management table without performing the garbage collection (step ST73), and the procedure goes through the following operations. Then, the write (1) is terminated.

5. When the command of the write (2) is issued, the procedure of the flowchart in FIG. 15 starts again. The operations similar to those of 1 and 2 described above are performed, and the procedure of the flowchart in FIG. 17 starts. The write (2) is the write in the same L block unit as the write (1). Therefore, with reference to the sequential management table, it can be confirmed that the L block unit including the write (2) is registered. Therefore, the result of step ST13 which is the first branch (IS IT P BLOCK UNIT ALREADY SEQUENTIALLY MANAGED?) is "Yes".

Since the write (2) is sequential continuation of the write (1), the result of step ST14 (CAN DATA BE APPENDED WHILE SEQUENTIAL MANAGEMENT CONTINUES?) is also "Yes". Therefore, "Yes" is finally obtained, and the procedure returns to FIG. 16. Accordingly, the result of step ST12 in FIG. 16 (IS IT WRITE BEING OBJECT OF SEQUENTIAL MANAGEMENT?) becomes "Yes", and the procedure of the flowchart of the sequential management write in FIG. 25 starts.

Since the write (2) is the write in the same L block unit as the write (1), the result of step ST70 which is the first branch (IS IT P BLOCK UNIT ALREADY SEQUENTIALLY MANAGED?) is "Yes". Therefore, the write (2) is sequentially appended in the same P block unit as the write (1) (step ST76). Even when the write (1) is added to the write (2), the write size is smaller than the P block unit size. Therefore, the result of step ST77 which is the next branch (FILLED WITH DATA TO FINAL PHYSICAL PAGE?) becomes "No". The procedure goes through the following operations, and then, the write (2) is terminated.

6. When the command of the write (3) is issued, the procedure of the flowchart in FIG. 15 starts again. The operations similar to those of 5 are performed, and the write (3) is terminated.

7. When the command of the write (4) is issued, the procedure of the flowchart in FIG. 15 starts again. After that, although the operation similar to that of 5 is performed, the write size becomes the same as the P block unit size when the writes (1) to (4) are added all together. Therefore, the result of step ST77 which is the final branch of 5 (FILLED WITH DATA TO FINAL PHYSICAL PAGE?) becomes "Yes", and the write (4) is terminated after the promotion processing to the P block unit management is performed (step ST78).

According to the above, in this technique, a single sequential management table is used in a period from the write (1) to (4), and the sequential management table is opened in the final processing for promoting to the P block unit management. Then, the write is terminated.

(Technique 2)

Preprocessing. In the technique 2, it is clearly indicated that the sequential management is performed to the L block unit including the write (1) by using the sequential management registration command before the write. The flowchart in FIG. 19 is a flow of the sequential management registration command. Since it is assumed that the write (1) be the write to the new P block unit which has not been managed in the past, the result of step ST22 which is the first branch (IS IT L BLOCK UNIT UNREGISTERED?) is "Yes". Therefore, the L block unit is registered in the sequential management registration command table (refer to FIG. 18) (step ST23).

1. When the command of the write (1) is issued, the procedure of the flowchart in FIG. 15 starts. In order to determine step ST3 which is the first branch (IS THERE CONSISTENCY WITH SEQUENTIAL COMMAND IN THE PAST?), the procedure of the determination flow in FIG. 21 starts.

2. Since the L block unit including the write (1) is registered in the sequential management registration command table in the preprocessing, the P block unit corresponding to the write (1) is taken out. Since it is assumed that the write (1) be the write to the new P block unit which has not been managed in the past, the result of step ST32 which is the first branch (Has the P block unit been already sequentially managed) is "No".

Since the write (1) begins from the beginning of the L block unit, the result of step ST33 which is the next branch (IS IT A NEW WRITE TO WHICH SEQUENTIAL MANAGEMENT CAN BE PERFORMED?) is "Yes". Further, since the size of the write (1) is smaller than the P block unit size, there is no registered P block unit other than this P block unit in the access determination of the write (1). Therefore, the result of step ST34 (HAVE ALL REGISTERED P BLOCK UNITS BEEN EXAMINED?) becomes "Yes", and "Yes" is finally returned (step ST35). Therefore, the result of step ST3 in FIG. 15 (IS THERE CONSISTENCY WITH SEQUENTIAL COMMAND IN THE PAST?) becomes "Yes", and the procedure goes through the following operations. Then, the procedure shifts to the write processing in the P block (step ST6).

3. FIG. 16 is the write processing in the P block. Since the write (1) is smaller than the P block unit size, the result of step ST11 which is the first branch (DOES WRITE SIZE COINCIDE WITH P BLOCK UNIT SIZE?) is "No". Since the L block unit including the write (1) is registered in the sequential management registration command table, the result of step ST12 which is the next branch (IS IT WRITE BEING OBJECT OF SEQUENTIAL MANAGEMENT?) becomes "Yes". Then, the procedure shifts to the sequential management write.

4. FIG. 25 is the flow of the sequential management write. Since it is assumed that the write (1) be the write to the new P block unit which has not been managed in the past, the result of step ST70 which is a first branch (IS IT P BLOCK UNIT ALREADY SEQUENTIALLY MANAGED?) is "No". Since the sequential management table is empty, step ST71 (DOES SEQUENTIAL MANAGEMENT TABLE HAVE FREE SPACE?) is "Yes". The content of the write (1) is registered in the sequential management table without performing the garbage collection, and the procedure goes through the following operations. Then, the write (1) is terminated.

5. When the command of the write (2) is issued, the procedure of the flowchart in FIG. 15 starts again. In order to determine step ST3 which is the first branch (IS THERE CONSISTENCY WITH SEQUENTIAL COMMAND IN THE PAST?), the procedure of the determination flowchart in FIG. 21 starts. Since the L block unit including the write (1) is registered in the sequential management registration command table in the preprocessing, the P block unit corresponding to the write (1) is taken out.

Since the write (1) has been registered in the sequential management table, the result of step ST32 which is the first branch (Has the P block unit been already sequentially managed) is "Yes". Since the write (2) starts just after the write (1), the result of step ST36 (CAN DATA BE APPENDED WHILE SEQUENTIAL MANAGEMENT CONTINUES?) is also "Yes".

Since the size of the write (2) is smaller than the P block unit size, there is no registered P block unit other than this P block unit in the access determination of the write (2). Therefore, the result of step ST34 (HAVE ALL REGISTERED P BLOCK UNITS BEEN EXAMINED?) becomes "Yes", and "Yes" is finally returned. Therefore, the result of step ST3 in FIG. 15 (IS THERE CONSISTENCY WITH SEQUENTIAL COMMAND IN THE PAST?) becomes "Yes", and the procedure goes through the following operations. Then, the procedure shifts to the write processing in the P block (step ST6).

6. FIG. 16 is the write processing in the P block. Since the write (2) is smaller than the P block unit size, the result of step ST11 which is the first branch (DOES WRITE SIZE COINCIDE WITH P BLOCK UNIT SIZE?) is "No". Since the L block unit including the write (2) is registered in the sequential management registration command table, the result of step ST12 which is the next branch (IS IT WRITE BEING OBJECT OF SEQUENTIAL MANAGEMENT?) becomes "Yes". Then, the procedure shifts to the sequential management write.

7. FIG. 25 is the flow of the sequential management write. Since the write (2) is the write in the same L block unit as the write (1), the result of step ST70 which is the first branch (IS IT P BLOCK UNIT ALREADY SEQUENTIALLY MANAGED?) is "Yes". Therefore, the write (2) is sequentially appended in the same P block unit as the write (1). Even when the write (1) is added to the write (2), the write size is smaller than the P block unit size. Therefore, the result of step ST77 which is the next branch (FILLED WITH DATA TO FINAL PHYSICAL PAGE?) becomes "No". The procedure goes through the following operations, and then, the write (2) is terminated.

8. When the command of the write (3) is issued, the procedure of the flowchart in FIG. 15 starts again. After that, the operations similar to those of 5, 6, and 7 are performed, and the write (3) is terminated.

9. When the command of the write (4) is issued, the procedure of the flowchart in FIG. 15 starts again. After that, although the operations similar to those of 5, 6, and 7 are performed, the write size becomes the same as the P block unit size when the writes (1) to (4) are added all together. Therefore, the result of step ST77 which is the final branch of 7 (FILLED WITH DATA TO FINAL PHYSICAL PAGE?) becomes "Yes", and the write (4) is terminated after the promotion processing to the P block unit management is performed. The "promotion processing" is an operation for deleting the L block unit including the write (1) from the sequential management table and the sequential management registration command table.

According to the above, in this technique, the single sequential management table is used in the period from the write (1) to (4), and the L block unit including the write (1) is deleted from the sequential management table and the sequential management registration command table in the final processing for promoting to the final P block unit management. Then, the write is terminated.

(Technique 3)

Preprocessing. In the technique 3, it is clearly indicated that the sequential management is performed to the L block unit including the write (1) by using the sequential management registration command before the write. FIG. 22 is a flow of the sequential management registration command. Since it is assumed that the write (1) be the write to the new P block unit which has not been managed in the past, the result of step ST42 which is a first branch (IS IT L BLOCK UNIT UNREGISTERED?) is "Yes". Since the sequential management table is empty, the result of step ST44 (DOES SEQUENTIAL MANAGEMENT TABLE HAVE FREE SPACE?) is also "Yes". Therefore, the L block unit is registered in the sequential management registration command table (step ST45).

The following write processing is exactly the same as that in the technique 2. However, the entry is deleted from the sequential management registration command table in post-processing.

Post-processing. In the technique 3, the L block unit registered in the preprocessing is deleted from the sequential management registration command table after the write has been performed. FIG. 23 is a flow of a sequential management delete command. Since the L block unit including the write (1) has been registered in the preprocessing, the result of step ST52 which is a first branch (IS IT L BLOCK UNIT REGISTERED?) is "Yes". Since the write of the P block unit size has been completed in the period from the write (1) to (4), the result of step ST54 (FILLED WITH DATA TO FINAL PHYSICAL PAGE?) is "Yes". Therefore, the L block unit including the write (1) is deleted from the sequential management registration command table without performing the promotion processing (step ST56).

According to the above, in this technique, the single sequential management table is used in the period from the write (1) to (4), and the L block unit including the write (1) is deleted from the sequential management table in the final processing for promoting the P block unit management. Then, the L block unit including the write (1) is deleted from the sequential management registration command table in the post-processing, and the write is terminated.

A Case of Write Method 2

(Conventional Method)

1. When the command of the write (1) is issued, the procedure of the flowchart in FIG. 15 starts. In the conventional method, since the sequential management is not performed, the result of step ST3 which is the first branch (IS THERE CONSISTENCY WITH SEQUENTIAL COMMAND IN THE PAST?) goes to "Yes". The procedure goes through the following operations in FIG. 15, and the procedure proceeds to the write processing in the P block (step ST6).

2. FIG. 16 is the write processing in the P block. Since the write (1) is smaller than the P block unit size, the result of step ST11 which is the first branch (DOES WRITE SIZE COINCIDE WITH P BLOCK UNIT SIZE?) is "No". Further, the sequential management is not performed in the conventional method, the result of step ST12 which is a next branch (IS IT WRITE BEING OBJECT OF SEQUENTIAL MANAGEMENT?) is "No". Therefore, the procedure proceeds to the P page unit management write processing of 3.

3. FIG. 26 is the P page unit management write. Since it is assumed that the write (1) be the write to the new P block unit which has not been managed in the past, the result of step ST80 which is the first branch (IS IT P BLOCK UNIT ALREADY BEING SUBJECT TO P PAGE UNIT MANAGEMENT?) is "No". In the write method 2, since the P page unit management table is full, the result of step ST81 (DOES P PAGE UNIT MANAGEMENT TABLE HAVE FREE SPACE?) is "No". After the free space is generated in the P page unit management table by performing the garbage collection (step ST82), the content of the write (1) is registered in the P page unit management table. Then, the procedure goes through the following operations, and the write (1) is terminated.

4. When the command of the write (2) is issued, the procedure of the flowchart in FIG. 15 starts again. After that, the operations similar to those of 1 and 2 are performed, and the procedure proceeds to the P page unit management write in FIG. 26. Whether the write (2) is performed to the same P block unit as the write (1) depends on the implementation method. When the write (2) is performed, the result of step ST80 which is the first branch (IS IT P BLOCK UNIT ALREADY BEING SUBJECT TO P PAGE UNIT MANAGEMENT?) is "Yes". In this case, the write is additionally performed to the same P block unit as the write (1), and the procedure goes through the following operations. Then, the write (1) is terminated.

When the write (2) is not performed to the same P block unit as the write (1), the result of step ST80 which is the branch (IS IT P BLOCK UNIT ALREADY BEING SUBJECT TO P PAGE UNIT MANAGEMENT?) is "No". In this case, since the P page unit management table has been full again by the write (1), the result of step ST81 (DOES P PAGE UNIT MANAGEMENT TABLE HAVE FREE SPACE?) is "No". After the free space is generated in the P page unit management table by performing the garbage collection (step ST82), the content of the write (2) is registered in the P page unit management table. Then, the procedure goes through the following operations, and the write (2) is terminated.

5. When the command of the write (3) is issued, the procedure of the flowchart in FIG. 15 starts again. After that, the operations similar to those of 4 are performed, and the write (3) is terminated.

6. When the command of the write (4) is issued, the procedure of the flowchart in FIG. 15 starts again. After that, the operations similar to those of 4 are performed, and the write (4) is terminated.

According to the above, one to four times of the garbage collections occur according to the control method in this technique.

(Technique 1)

The technique 1 is exactly the same as the case of the write method 1. Therefore, in this technique, the single sequential management table is used in the period from the write (1) to (4), and the sequential management table is opened in the final processing for promoting to the P block unit management. Then, the write is terminated.

(Technique 2)

The technique 2 is exactly the same as the case of the write method 1. Therefore, in this technique, the single sequential management table is used in the period from the write (1) to (4), and the sequential management table is opened in the final processing for promoting to the P block unit management. Then, the write is terminated.

(Technique 3)

The technique 3 is exactly the same as the case of the write method 1. Therefore, in this technique, the single sequential management table is used in the period from the write (1) to (4), and the sequential management table is opened in the final processing for promoting to the P block unit management. Then, the write is terminated.

A Case of Write Method 3

(Conventional Method)

1. When the command of the write (1) is issued, the procedure of the flowchart in FIG. 15 starts. In the conventional method, since the sequential management is not performed, the result of step ST3 which is the first branch (IS THERE CONSISTENCY WITH SEQUENTIAL COMMAND IN THE PAST?) goes to "Yes". The procedure goes through the following operations in FIG. 15, and the procedure proceeds to the write processing in the P block (step ST16).

2. FIG. 16 is the write processing in the P block. Since the write (1) is smaller than the P block unit size, the result of step ST11 which is the first branch (DOES WRITE SIZE COINCIDE WITH P BLOCK UNIT SIZE?) is "No". Further, the sequential management is not performed in the conventional method, the result of step ST12 which is a next branch (IS IT WRITE BEING OBJECT OF SEQUENTIAL MANAGEMENT?) is "No". Therefore, the procedure proceeds to the P page unit management write processing of 3.

3. FIG. 26 is the P page unit management write. Since it is assumed that the write (1) be the write to the new P block unit which has not been managed in the past, the result of step ST80 which is the first branch (IS IT P BLOCK UNIT ALREADY BEING SUBJECT TO P PAGE UNIT MANAGEMENT?) is "No". In the write method 3, since the P page unit management table is full, the result of step ST81 (DOES P PAGE UNIT MANAGEMENT TABLE HAVE FREE SPACE?) is "No". After the free space is generated in the P page unit management table by performing the garbage collection (step ST82), the content of the write (1) is registered in the P page unit management table. Then, the procedure goes through the following operations, and the write (1) is terminated.

4. When the command of the write (2) is issued, the procedure of the flowchart in FIG. 15 starts again. After that, the operations similar to those of 1 and 2 are performed, and the procedure proceeds to the P page unit management write in FIG. 26. Whether the write (2) is performed to the same P block unit as the write (1) depends on the implementation method. When the write (2) is performed, the result of step ST80 which is the first branch (Has the P page unit management already been performed to the P block unit) is "Yes". In this case, the write is additionally performed to the same P block unit as the write (1), and the procedure goes through the following operations. Then, the write (1) is terminated.

When the write (2) is not performed to the same P block unit as the write (1), the result of step ST80 which is the branch (IS IT P BLOCK UNIT ALREADY BEING SUBJECT TO P PAGE UNIT MANAGEMENT?) is "No". In this case, since the P page unit management table has been full again by the write (1), the result of step ST81 (DOES P PAGE UNIT MANAGEMENT TABLE HAVE FREE SPACE?) is "No". After the free space is generated in the P page unit management table by performing the garbage collection (step ST82), the content of the write (2) is registered in the P page unit management table. Then, the procedure goes through the following operations, and the write (2) is terminated.

According to the above, the garbage collection occurs once or twice according to the control method in this technique.

(Technique 1)

1. When the command of the write (1) is issued, the procedure of the flowchart in FIG. 15 starts. In the technique 1, since the sequential management using the sequential command is not performed, the result of step ST3 which is the first branch (IS THERE CONSISTENCY WITH SEQUENTIAL COMMAND IN THE PAST?) becomes "Yes". The procedure goes through the following operations in FIG. 15, and the procedure proceeds to the write processing in the P block (step ST6).

2. FIG. 16 is the write processing in the P block. Since the write (1) is smaller than the P block unit size, the result of step ST11 which is the first branch (DOES WRITE SIZE COINCIDE WITH P BLOCK UNIT SIZE?) is "No". In order to obtain the determination result of step ST12 which is the next branch (IS IT WRITE BEING OBJECT OF SEQUENTIAL MANAGEMENT?), the procedure of the flowchart in FIG. 17 starts.

3. Since it is assumed that the write (1) be the write to the new P block unit which has not been managed in the past, the result of step ST13 which is the first branch (IS IT P BLOCK UNIT ALREADY SEQUENTIALLY MANAGED?) is "No". The determination method of step ST17 which is the next branch (IS IT A NEW WRITE TO WHICH SEQUENTIAL MANAGEMENT CAN BE PERFORMED?) has the arbitrariness according to the implementation. The exemplified determination method (It is assumed that a new write which is equal to or larger than ¼ of the P block unit size be sequential management object) is used. Therefore, the result of the branch is "Yes". Therefore, "Yes" is finally obtained, and the procedure returns to FIG. 16. Accordingly, the result of step ST12 in FIG. 16 (IS IT WRITE BEING OBJECT OF SEQUENTIAL MANAGEMENT?) becomes "Yes", and the procedure shifts to the sequential management write.

4. FIG. 25 is the flow of the sequential management write. Since it is assumed that the write (1) be the write to the new P block unit which has not been managed in the past, the result of step ST70 which is a first branch (IS IT P BLOCK UNIT ALREADY SEQUENTIALLY MANAGED?) is "No". Since the sequential management table is empty, the result of step ST71 (DOES SEQUENTIAL MANAGEMENT TABLE HAVE FREE SPACE?) is "Yes". The content of the write (1) is registered in the sequential management table without performing the garbage collection, and the procedure goes through the following operations. Then, the write (1) is terminated.

5. When the command of the write (2) is issued, the procedure of the flowchart in FIG. 15 starts again. After that, the operations similar to those of 1 and 2 are performed, and the procedure of the flowchart in FIG. 17 starts. The write (2) is the write in the same L block unit as the write (1) (refer to FIG. 31). Therefore, with reference to the sequential management table, it can be confirmed that the L block unit including the write (2) is registered. Therefore, the result of step ST13 which is the first branch (IS IT P BLOCK UNIT ALREADY SEQUENTIALLY MANAGED?) is "Yes".

Since the write (2) is not the sequential continuation of the write (1), the result of step ST14 (CAN DATA BE APPENDED WHILE SEQUENTIAL MANAGEMENT CONTINUES?) is "No". Therefore, sequential management terminating processing is performed (step ST16). This processing is to demote the write (1) to which the sequential management is performed to the P page unit management. The L block unit including the write (1) is deleted from the sequential management table and registered in the P page unit management table. However, since the P page unit management table is full in the write method 3, the content of the write (1) is registered in the P page unit management table after the garbage collection is once performed and the free space is generated in the P page unit management table. After that, "No" is finally obtained, and the procedure returns to FIG. 16. Accordingly, the result of step ST12 in FIG. 16 (IS IT WRITE BEING OBJECT OF SEQUENTIAL MANAGEMENT?) becomes "No", and the procedure proceeds to the P page unit management write in FIG. 26.

6. Whether the write (2) is performed to the same P block unit as the write (1) depends on the implementation method. When the write (2) is performed, the result of step ST80 which is the first branch (IS IT P BLOCK UNIT ALREADY BEING SUBJECT TO P PAGE UNIT MANAGEMENT?) is "Yes". In this case, the write is additionally performed to the same P block unit as the write (1), and the procedure goes through the following operations. Then, the write (1) is terminated.

When the write (2) is not performed to the same P block unit as the write (1), the result of step ST80 which is the branch (IS IT P BLOCK UNIT ALREADY BEING SUBJECT TO P PAGE UNIT MANAGEMENT?) is "No". In this case, since the P page unit management table has been full again by the write (1), the result of step ST81 (DOES P PAGE UNIT MANAGEMENT TABLE HAVE FREE SPACE?) is "No". After the free space is generated in the P page unit management table by performing the garbage collection (step ST82), the content of the write (2) is registered in the P page unit management table. Then, the procedure goes through the following operations, and the write (2) is terminated.

According to the above, the garbage collection occurs once or twice according to the control method in this technique.

(Technique 2)

Preprocessing. This is exactly the same as the preprocessing in the technique 2 of the write method 1.

1. The write (1) is exactly the same as the write (1) in the technique 2 of the write method 1.

2. When the command of the write (2) is issued, the procedure of the flow in FIG. 15 starts again. In order to determine step ST3 which is the first branch (IS THERE CONSISTENCY WITH SEQUENTIAL COMMAND IN THE PAST?), the procedure of the determination flowchart in FIG. 21 starts. Since the L block unit including the write (1) is registered in the sequential management registration command table in the preprocessing, the P block unit corresponding to the write (1) is taken out. Since the write (1) has been registered in the sequential management table, the result of step ST32 which is the first branch (Has the P block unit been already sequentially managed) is "Yes". However, since the write (2) does not start just after the write (1), the result of step ST36 (CAN DATA BE APPENDED WHILE SEQUENTIAL MANAGEMENT CONTINUES?) is "No". Therefore, since "No" is returned, the result of step ST3 in FIG. 15 (IS THERE CONSISTENCY WITH SEQUENTIAL COMMAND IN THE PAST?) becomes "No", and the command is not received.

According to the above, the command is not received in this technique.

(Technique 3)

Preprocessing. This is exactly the same as the preprocessing in the technique 3 of the write method 1.

1. The write (1) is exactly the same as the write (1) in the technique 3 of the write method 1.

2. When the command of the write (2) is issued, the procedure of the flow in FIG. 15 starts again. In order to determine step ST3 which is the first branch (IS THERE CONSISTENCY WITH SEQUENTIAL COMMAND IN THE PAST?), the procedure of the determination flowchart in FIG. 21 starts. Since the L block unit including the write (1) is registered in the sequential management registration command table in the preprocessing, the P block unit corresponding to the write (1) is taken out. Since the write (1) has been registered in the sequential management table, the result of step ST32 which is the first branch (Has the P block unit been already sequentially managed) is "Yes". However, since the write (2) does not start just after the write (1), the result of step ST36 (CAN DATA BE APPENDED WHILE SEQUENTIAL MANAGEMENT CONTINUES?) is "No". Therefore, since "No" is returned, the result of step ST3 in FIG. 15 (IS THERE CONSISTENCY WITH SEQUENTIAL COMMAND IN THE PAST?) becomes "No", and the command is not received.

According to the above, the command is not received in this technique.

A Case of Write Method 4

(Conventional Method)

The conventional method is exactly the same as the case of the write method 2. Therefore, one to four times of the garbage collections occur according to the control method in this technique.

(Technique 1)

1 to 3. The procedures 1 to 3 are exactly the same as those in the technique 1 of the write method 1.

4. FIG. 25 is the flow of the sequential management write. Since it is assumed that the write (1) be the write to the new P block unit which has not been managed in the past, the result of step ST70 which is a first branch (IS IT P BLOCK UNIT ALREADY SEQUENTIALLY MANAGED?) is "No". Since the sequential management table is full, the result of step ST71 (DOES SEQUENTIAL MANAGEMENT TABLE HAVE FREE SPACE?) is "No". The content of the write (1) is registered after the free space is generated in the sequential management table by performing the garbage collection (step ST72). Then, the procedure goes through the following operations, and the write (1) is terminated.

5. The following procedure is exactly the same as that in the technique 1 of the write method 1.

According to the above, the garbage collection occurs once according to the control method in this technique.

(Technique 2)

Preprocessing. This is exactly the same as the preprocessing in the technique 2 of the write method 1.

1 to 3. The procedures 1 to 3 are exactly the same as those in the technique 2 of the write method 1.

4. FIG. 25 is the flow of the sequential management write. Since it is assumed that the write (1) be the write to the new P block unit which has not been managed in the past, the result of step ST70 which is a first branch (IS IT P BLOCK UNIT ALREADY SEQUENTIALLY MANAGED?) is "No". Since the sequential management table is full, the result of step ST71 (DOES SEQUENTIAL MANAGEMENT TABLE HAVE FREE SPACE?) is "No". The content of the write (1) is registered after the free space is generated in the sequential management table by performing the garbage collection (step ST72). Then, the procedure goes through the following operations, and the write (1) is terminated.

5. The following procedure is exactly the same as that in the technique 1 of the write method 1.

According to the above, the garbage collection occurs once according to the control method in this technique.

(Technique 3)

Preprocessing. In the technique 3, it is clearly indicated that the sequential management is performed to the L block unit including the write (1) by using the sequential management registration command before the write. FIG. 22 is a flow of the sequential management registration command. Since it is assumed that the write (1) be the write to the new P block unit which has not been managed in the past, the result of step ST42 which is a first branch (IS IT L BLOCK UNIT UNREGISTERED?) is "Yes". However, since the sequential management table is full, the result of step ST44 (DOES SEQUENTIAL MANAGEMENT TABLE HAVE FREE SPACE?) is "No". Therefore, the command is not received (step ST43). According to the above, the command is not received in this technique.

All the cases in FIG. 28 have been described above. An effect of these will be described below.

One to four P page unit management tables are consumed when the conventional method is used in the write method 1. On the other hand, the sequential management table is only temporarily used and is not consumed in the techniques 1 to 3. When the management table becomes full, it triggers the garbage collection. Therefore, in the write method 1, the garbage collection is suppressed by this technique compared with the conventional method.

The sequential management table completes in itself (refer to FIG. 12). However, each entry of the table has the table in FIG. 14 in the P page unit management table (refer to FIG. 13), and a larger region to hold the table is necessary. Therefore, the sequential management table is easy to have large number of entries (as an example, it is assumed that $d \geq 4$, $e \geq 4$, e is easily enlarged). In consideration of this, it can be understood that the garbage collection is suppressed compared with the conventional method by this technique.

The garbage collection occurs when the conventional method is used in the write method 2. On the other hand, the sequential management table is only temporarily used and is not consumed in the techniques 1 to 3, and the garbage collection does not occur in the techniques 1 to 3. Therefore, it can be considered that the garbage collection is also suppressed compared with the conventional method by this technique in the write method 2.

When the conventional method is used in the write method 3, the garbage collection occurs. Since the write method 3 is not the sequential write, the garbage collection also occurs in the technique 1. However, it is possible not to receive the command by using the techniques 2 and 3. Therefore, a method to suppress the garbage collection can be provided according to this technique in the write method 3.

When the conventional method is used in the write method 4, the garbage collection occurs. Since the sequential management table is full in the write method 4, the garbage collection also occurs in the techniques 1 and 2. However, the number of times of the garbage collections are suppressed to equal to or less than that in the conventional method. Also, it is possible not to receive the command when the technique 3 is used. Therefore, it can be considered that this technique in the write method 4 also provides a method to suppress the garbage collection.

2. For Other Applications

In the write method 3, it can be determined by the sequential management registration command table in FIG. 18 whether the specific L block unit is performing the sequential write. This is because when the L block unit to which the sequential management registration command is performed is registered in the sequential management registration command table in FIG. 18 and the sequential write is completed, the L block unit is deleted from the sequential management registration command table in FIG. 18 by the delete command.

Therefore, in a case where the host device has tried to read a data region during the sequential write, the control "Until the sequential write is completed, write content is not determined, and the data which has already been written before the sequential write is returned" is available. By using this control, the handling of the L block unit during the sequential write can be selectively used according to the situations. This will be described with reference to the drawings.

Figure 33:
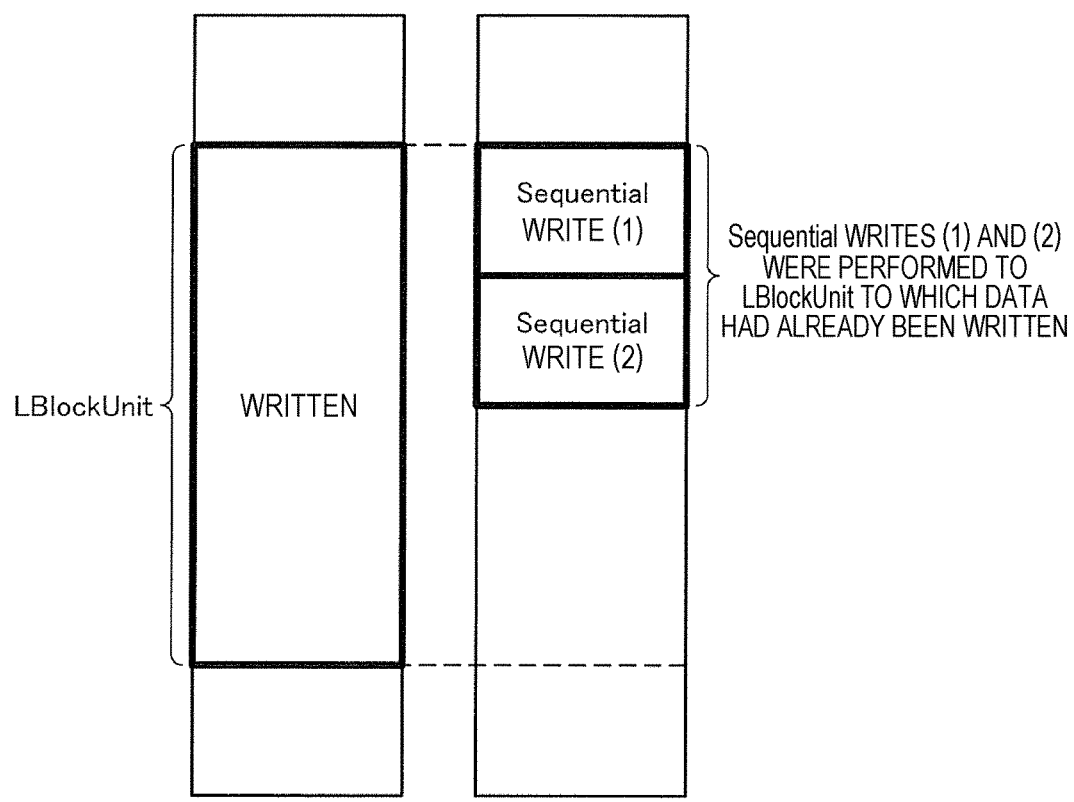
FIG. 33 is a schematic diagram to describe handling of an L block unit at the time of reading.
Figure 34:
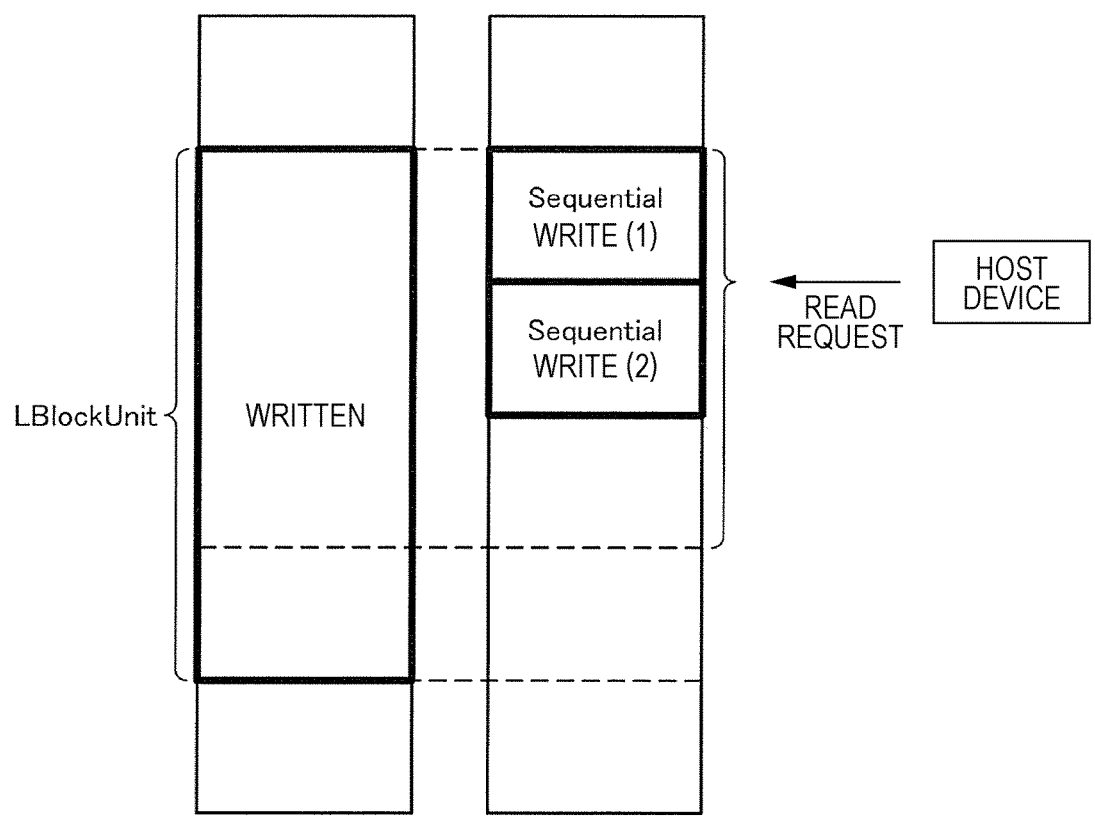
FIG. 34 is a schematic diagram to describe the handling of the L block unit at the time of reading.

First, the handling of the L block unit at the time of reading will be described. FIG. 33 illustrates a situation in which the sequential management registration command is issued to one L block unit having the data written therein and the sequential writes (1) and (2) are performed. In this situation, the case is considered where read request in FIG. 34 is performed to the same L block unit without issuing the sequential management delete command.

At this time, regarding the data corresponding to the L block unit in which the read request is performed, there are two kinds of the data, that is, the written data and the data during the sequential write. Therefore, the flash memory device can arbitrarily use the two kinds of the data as the data to be returned to the host. Examples will be illustrated in FIGS. 35 to 37.

Figure 35:
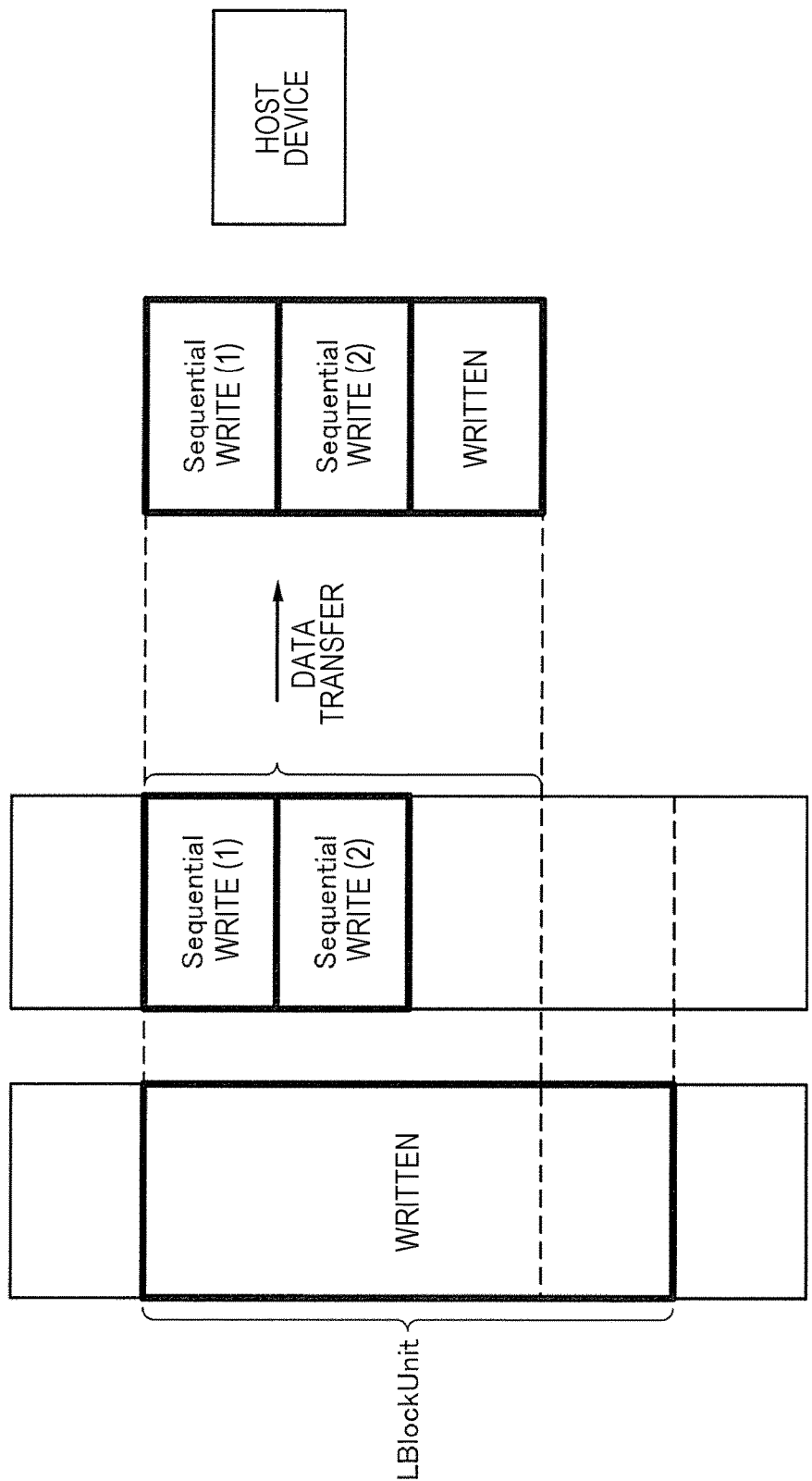
FIG. 35 is a schematic diagram to describe the handling of the L block unit at the time of reading.
Figure 36:
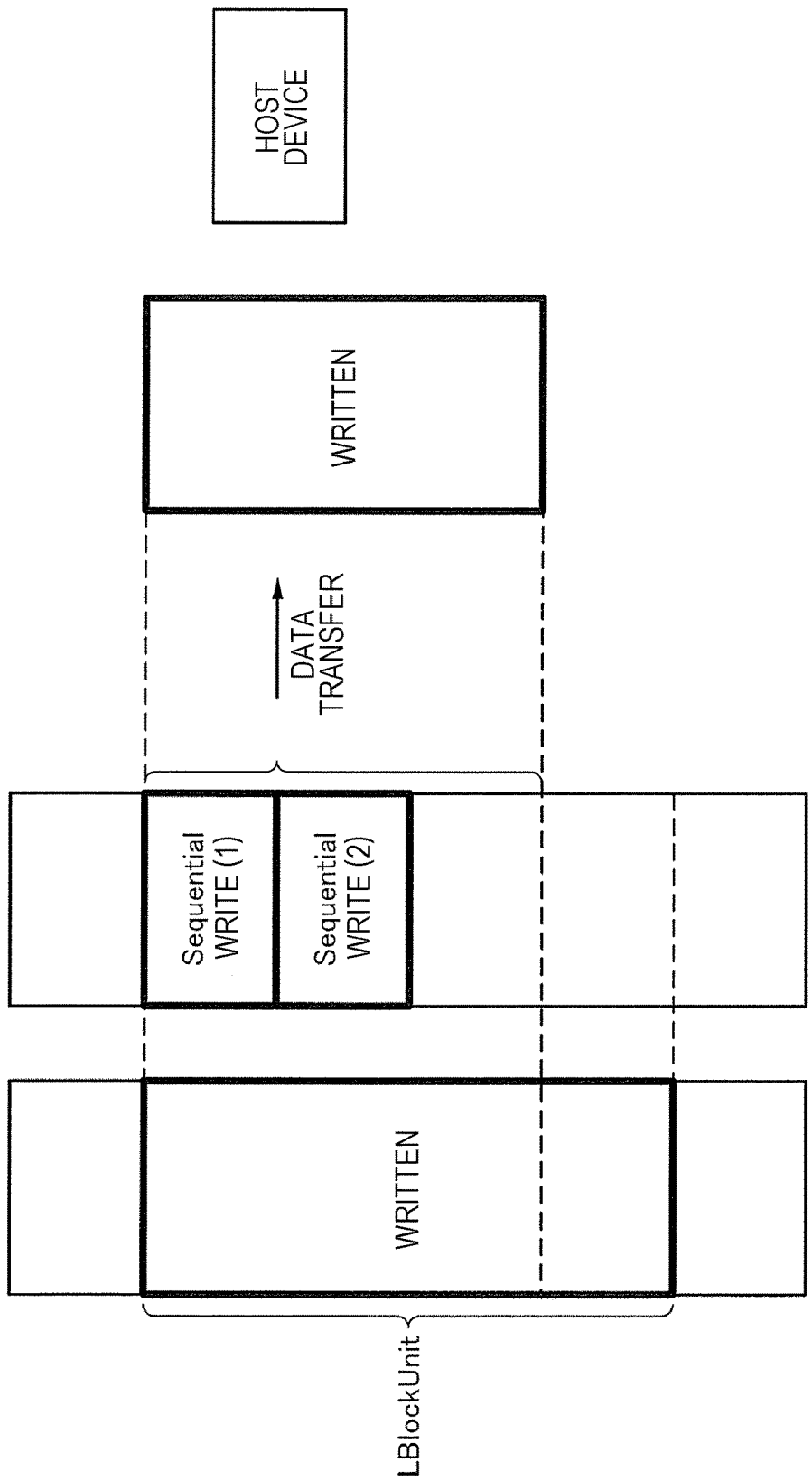
FIG. 36 is a schematic diagram to describe the handling of the L block unit at the time of reading.
Figure 37:
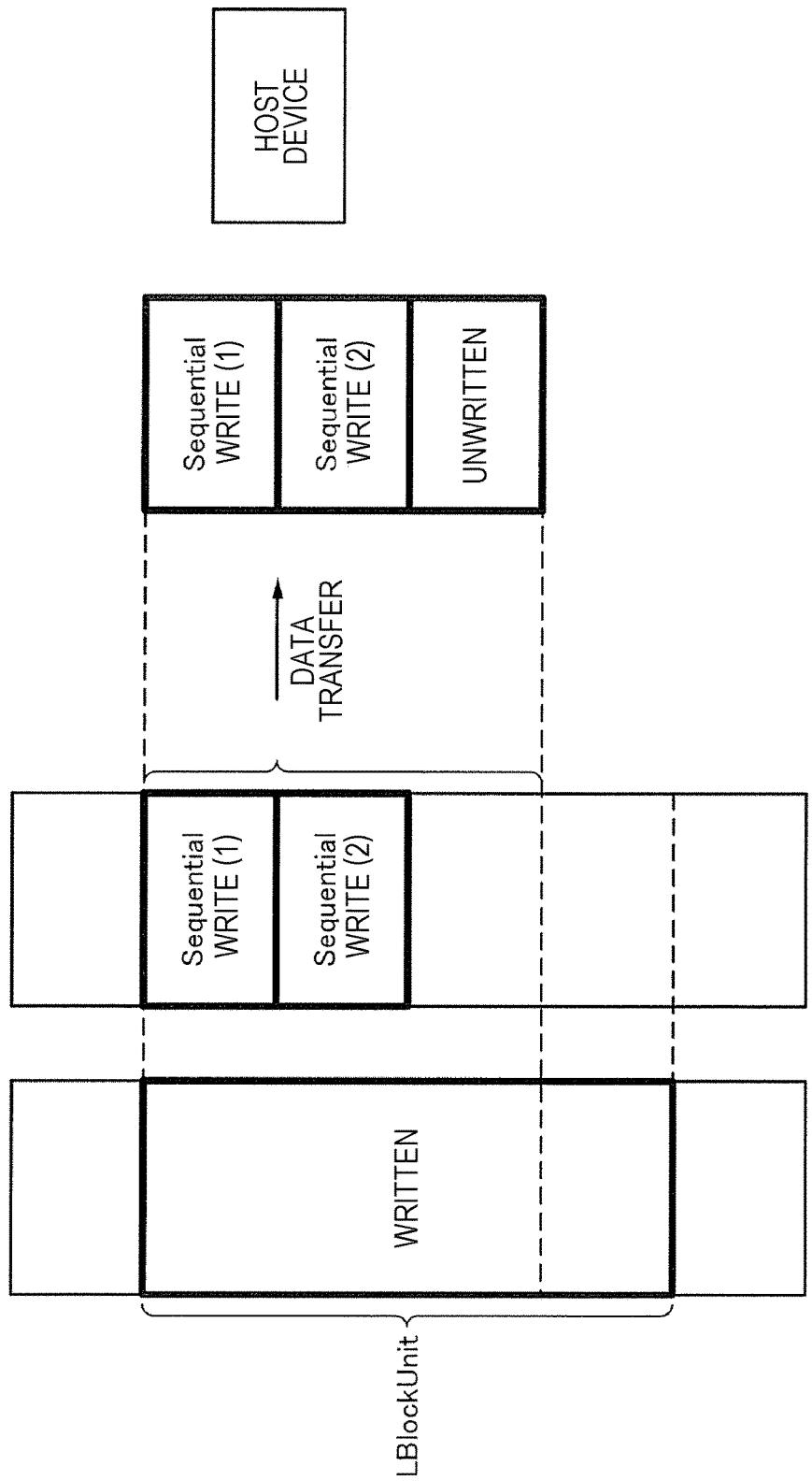
FIG. 37 is a schematic diagram to describe the handling of the L block unit at the time of reading.

FIG. 35 is a method to return the data during the sequential write regarding a part where the data during sequential write exists and return the written data regarding a part other than the above. FIG. 36 is a method to return the written data while the data during the sequential write is ignored. FIG. 37 is a method to return the data during the sequential write regarding the part where the data during the sequential write exists and return blank data (0xFF) regarding the part other than the above.

The above three kinds of methods may be appropriate or not appropriate according to the situations. For example, when the sequential write is performed to the management data of the file system, it is necessary that the written data be always the latest. Therefore, it is preferable that the sequential write be immediately reflected without waiting the completion of the sequential write, and the control illustrated in FIGS. 35 and 37 is preferable. On the other hand, in the situation where the large-sized data which is supposed to be written at once is divided and written, it is preferable that all the divided data be reflected after all the divided data has been written. The control indicated in FIG. 36 is preferable.

Figure 38:
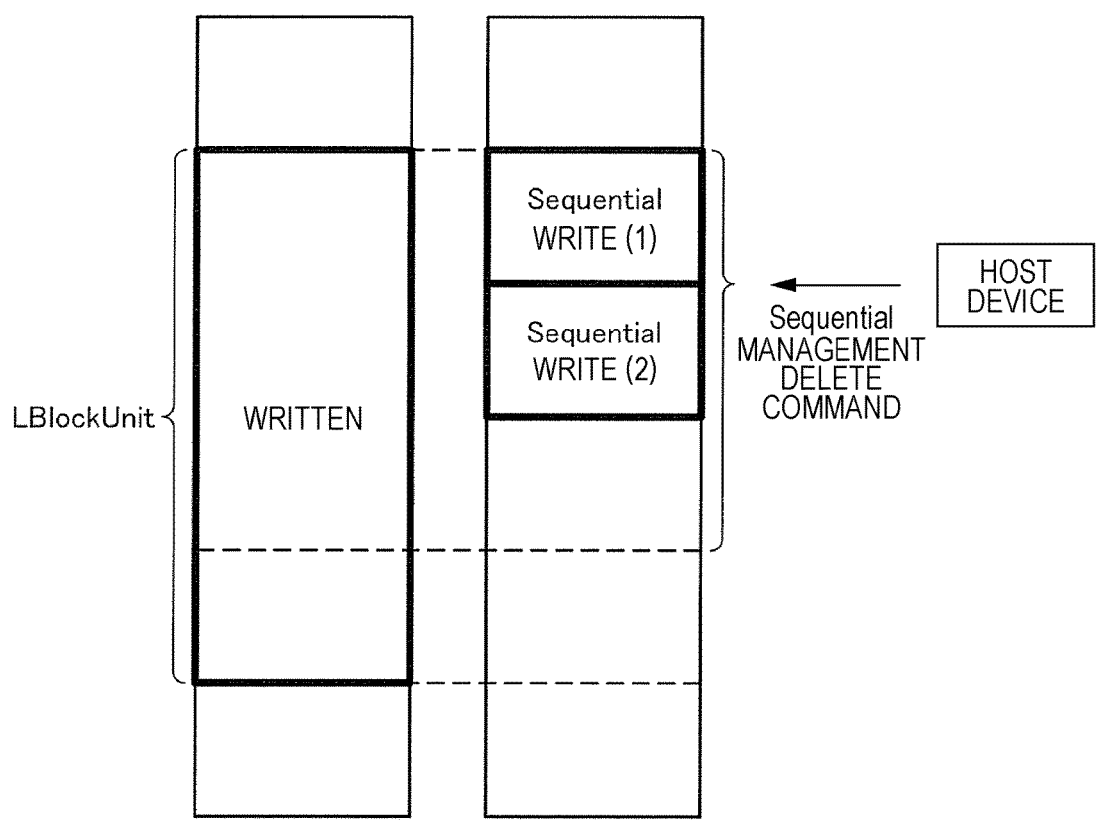
FIG. 38 is a schematic diagram to describe the handling of the L block unit in a case where the sequential write is terminated in the middle.

Next, the handling of the L block unit in a case where the sequential write is terminated in the middle will be described. A case is considered where the sequential management delete command is issued in a situation where the sequential write is not completed as indicated in FIG. 38. In this case, the result of step ST54 which is a branch indicated in the sequential management delete command in FIG. 23 (FILLED WITH DATA TO FINAL PHYSICAL PAGE?) becomes "No", and the promotion processing to the P block unit management (step ST55) occurs. In the promotion processing, the content of the L block unit during the sequential write is determined, and the P block unit management is performed to the L block unit. At this time, the two kinds of data, that is, the written data and the data during the sequential write can be arbitrarily used. The examples will be illustrated in FIGS. 39 to 41.

Figure 39:
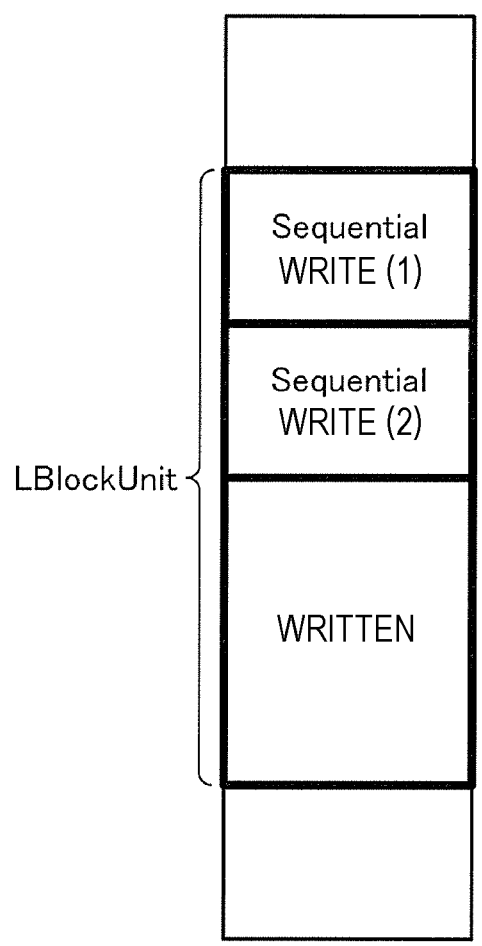
FIG. 39 is a schematic diagram to describe the handling of the L block unit in a case where the sequential write is terminated in the middle.
Figure 40:
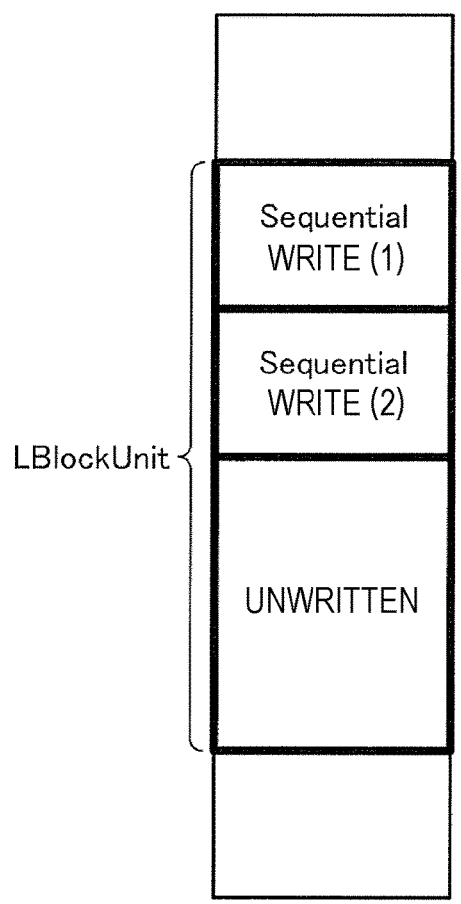
FIG. 40 is a schematic diagram to describe the handling of the L block unit in a case where the sequential write is terminated in the middle.
Figure 41:
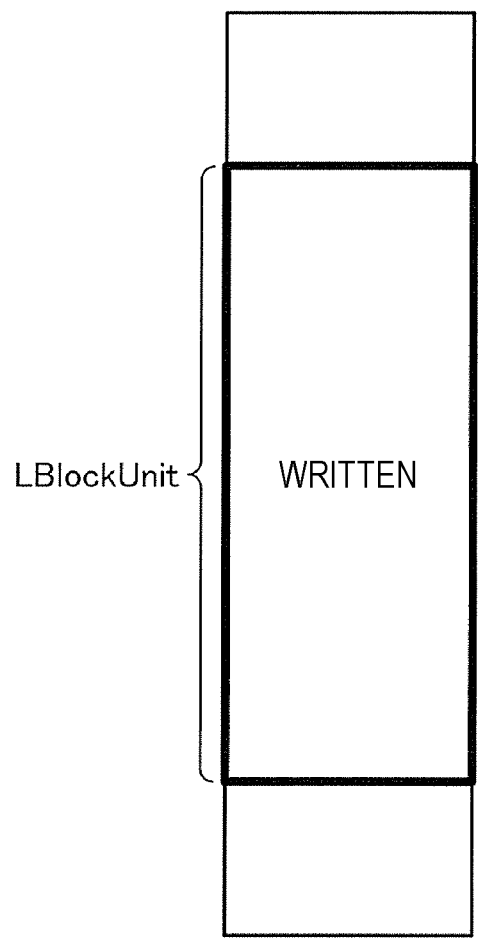
FIG. 41 is a schematic diagram to describe the handling of the L block unit in a case where the sequential write is terminated in the middle.

FIG. 39 is a method to use the data during the sequential write regarding the part where the data during the sequential write exists and generate a new L block unit by using the written data regarding the part other than the above, and in which the P block unit management be performed to the new L block. FIG. 40 is a method to use the data during the sequential write regarding the part where the data during the sequential write exists and generate a new L block unit by using the blank data (0xFF) regarding the part other than the above, and in which the P block unit management be performed to the new L block. FIG. 41 is a method to generate a new L block unit by using only the written data while ignoring the data during the sequential write, and in which the P block unit management be performed to the new L block unit.

The above three kinds of methods may also be appropriate or not appropriate according to the situations. For example, in a case where it is preferable to remain as large data as possible after the sequential write has been completed in the middle, the method of FIG. 39 is appropriate. In the situation where the data of large size is divided and written, in a case where old data is mixed in the L block unit during the sequential write, it is hard to distinguish the old data from the large-sized data which is being written and confusion occurs. Therefore, the method of FIG. 40 is appropriate. In a case where it is not preferable to remain a part of the data in a situation where the sequential write is not completed, the method of FIG. 41 is appropriate.

Figure 42:
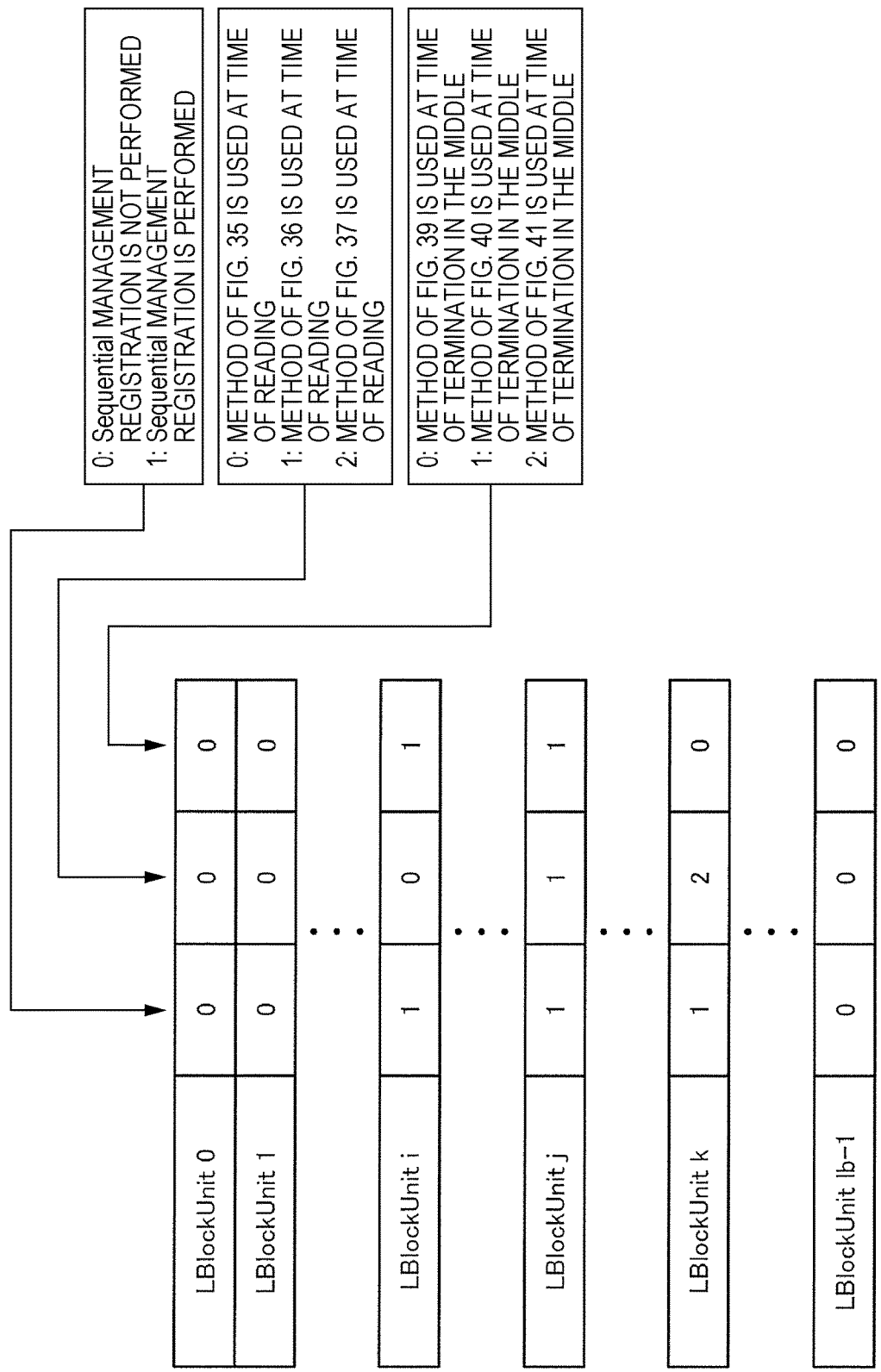
FIG. 42 is a schematic diagram to describe a configuration method of a sequential management registration command table.

As described above, the L block unit during the sequential write can be arbitrarily handled with respect to the reading and the completion in the middle. In the present disclosure, it is expected that one of the reading or the completion in the middle be selected at the time of mounting and the selected one is consistently used at the time of the operation. However, in the method 3, the handling of the L block unit during the sequential write is given to the sequential management registration command as a parameter. Accordingly, the handling of the L block unit can be dynamically controlled at the time of the operation. FIG. 42 indicates a configuration method of the sequential management registration command table of the above case.

FIG. 42 is a schematic diagram in which FIG. 18 is extended. Other than a column indicating that "registered according to the sequential management registration command or not", columns are added which respectively represent two parameters for giving the methods of the reading and the completion in the middle. When the sequential management registration command is executed, the two parameters are specified and registered in the sequential management registration command table. Accordingly, it can be determined which control method of FIGS. 35 to 37 and FIGS. 39 to 41 is used at the time of the reading and the completion in the middle.

By using this determination method, the handling of the L block unit during the sequential write can be dynamically controlled at the time of the operation. For example, in a case where a video camera is considered as the host device and moving picture data is photographed by and stored in the camera, the control can be applied in which a part of the photographing data is controlled by the method in FIG. 36 and the management data of a file system to manage the photographing data is controlled by the method of FIG. 35.

The present disclosure can have configurations below.

(1)

A non-volatile memory device comprising:

a non-volatile memory unit;

a control unit; and an interface, wherein the control unit configured to receive a write request; determine whether data is an object of a write of sequential management when a write size of the received data is smaller than a management unit of erasure; perform first write processing in which the received data smaller than the management unit of the erasure is sequentially written when the data is the object of the write of the sequential management; and perform second write processing in which the received data smaller than the management unit of the erasure is written by the management unit of the write when the data is not the object of the write of the sequential management.

(2)

The non-volatile memory device according to (1), wherein a specific region to which the first write processing is performed is previously set.

(3)

The non-volatile memory device according to (1), wherein whether the data is the object of the write of the sequential management is determined according to sequentiality of the write request determined based on the write in the past.

(4)

The non-volatile memory device according to (1), wherein a host device clearly indicates via the interface whether the data is the object of the write of the sequential management.

(5)

The non-volatile memory device according to (1), wherein the host device clearly indicates via the interface whether the data is the object of the write of the sequential management and a host also manages allocation of a write region.

(6)

A non-volatile memory control device configured to receive a write request; determine whether data is an object of a write of sequential management when a write size of the received data is smaller than a management unit of erasure; perform first write processing in which the received data smaller than the management unit of the erasure is sequentially written when the data is the object of the write of the sequential management; and perform second write processing in which the received data smaller than the management unit of the erasure is written by the management unit of the write when the data is not the object of the write of the sequential management.

(7)

A non-volatile memory control device, wherein a command of a side of a host is defined which instructs to write data, which is smaller than a management unit of erasure, with sequential management to a specific region of a non-volatile memory device.

(8)

The non-volatile memory control device according to (7), wherein the side of the host instructs to write with the sequential management and also manages allocation of a write region.

(9)

A non-volatile memory control method, comprising:

receiving a write request;

determining whether data is an object of a write of sequential management when a write size of the received data is smaller than a management unit of erasure;

performing first write processing in which the received data smaller than the management unit of the erasure is sequentially written when the data is the object of the write of the sequential management; and performing second write processing in which the received data smaller than the management unit of the erasure is written by the management unit of the write when the data is not the object of the write of the sequential management.

(10)

A non-volatile memory control method, wherein a command of a side of a host is defined which instructs to write data, which is smaller than a management unit of erasure, with sequential management to a specific region of a non-volatile memory device.

(11)

The non-volatile memory control method according to (10), wherein the side of the host instructs to write with the sequential management and also manages allocation of a write region.

3. Modification

An embodiment of the present disclosure has been specifically described above. The present disclosure is not limited to each embodiment described above, and various modifications based on technical ideas of the present disclosure are possible. For example, a configuration, a method, a procedure, a shape, a material, and a value exemplified in the above-mentioned embodiments are only exemplary. A configuration, a method, a procedure, a shape, a material, and a value different from those in the embodiment may be used as necessary.

With respect to the embodiment of the present disclosure, an example of the case where the flash memory is used as the non-volatile memory has been specifically described above. However, the above-mentioned non-volatile memory is not limited to the flash memory. All the non-volatile memories can be applied which can configure the physical address space so that the size to be an erasure unit is equal to or larger than the size to be a write unit. When the present disclosure is applied to the non-volatile memory other than the flash memory, the P block unit and the P page unit in the present disclosure may respectively be replaced to the erasure unit and the write unit in the non-volatile memory to which the present disclosure is applied.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

1 Flash memory device
2 Flash memory unit
3 Memory control unit
4 External interface

The invention claimed is:
1. A memory device, comprising:
a memory unit; and
a control unit configured to:
  receive a write instruction;
  determine whether first data is an object of a write of sequential management,
    wherein sequential write is executed in a first write region of the memory unit;
  execute a first write process in which the first data is written by a sequential write method, in an event the first data is the object of the write of the sequential management;
  execute a second write process in which the first data is written by a method which is different from the sequential write method, in an event the first data is other than the object of the write of the sequential management;
  receive a first method of a first plurality of methods from an external device based on a termination of the sequential write in a middle of the sequential write;
  read the first data from the first write region based on the received first method; and
  generate a second write region different from the first write region, wherein the second write region comprises one of:
    the first data during the sequential write from a first part of the first write region and second data from a second part of the first write region other than the first part, based on the sequential write completed in the middle,
    the first data during the sequential write from the first part of the first write region and blank data, based on the second write region comprises divided-data, or
    only the second data from the second part of the first write region other than the first part, based on the sequential write is incomplete, wherein the first data during the sequential write is ignored.

2. The memory device according to claim 1, wherein the first write region, to which the first write process is executed, is previously set.

3. The memory device according to claim 1, wherein the control unit is further configured to execute the second write process in which the first data is written by a management unit of the write.

4. The memory device according to claim 1, wherein the control unit is further configured to execute one of the second write process or execute a process in which a write request is denied, in an event the first data is other than the object of the write of the sequential management.

5. The memory device according to claim 1, wherein the first plurality of methods comprise the first method and a second method, and
wherein the control unit is further configured to
  read, sequentially written first data from the first part of the first write region where the first data written by the sequential write method exists, and read written data from the second part of the first write region, based on the reception of the first method at the control unit; and
  read, the sequentially first written data from the first part of the first write region where the first data written by the sequential write method exists, and read particular data from the second part of the first write region where the sequentially first written data is absent, based on a reception of the second method at the control unit.

6. The memory device according to claim 1, wherein the control unit is further configured to:
  receive a second method of a second plurality of methods from the external device to read the first data from the first write region, in an event the control unit reads the first data from the first write region where the sequential write is in progress,
  wherein the second plurality of methods comprise the second method and a third method;
  read, the first data during the sequential write from the first part of the first write region where the first data written by the sequential write method during the sequential write exists, and read written data from the second part of the first write region, based on the reception of the second method at the control unit; and
  read first written data from the first write region while the first data during the sequential write is ignored, based on a reception of the third method at the control unit.

7. A memory control hardware device, comprising:
a memory unit; and
circuitry configured to:
  receive a write instruction;
  determine whether first data is an object of a write of sequential management,
    wherein sequential write is executed in a first write region of the memory unit;
  execute a first write process in which the first data is written by a sequential write method, in an event the first data is the object of the write of the sequential management;
  execute a second write process in which the first data is written by a first method which is different from the sequential write method, in an event the first data is other than the object of the write of the sequential management;
  receive a second method of a plurality of methods from an external device based on a termination of the sequential write in a middle of the sequential write;

read the first data from the first write region based on the received second method; and
generate a second write region different from the first write region, wherein the second write region comprises one of:
 the first data during the sequential write from a first part of the first write region and second data from a second part of the first write region other than the first part, based on the sequential write completed in the middle,
 the first data during the sequential write from the first part of the first write region and blank data, based on the second write region comprises divided-data, or
 only the second data from the second part of the first write region other than the first part, based on the sequential write is incomplete, wherein the first data during the sequential write is ignored.

8. A method, comprising:
receiving, by a memory device, a write instruction,
determining whether first data is an object of a write of sequential management,
wherein sequential write is executed in a first write region of the memory device;
executing a first write processing in which the first data is written by a sequential write method, in an event the first data is the object of the write of the sequential management;
executing a second write processing in which the first data is written by a first method which is different from the sequential write method, in an event the first data is other than the object of the write of the sequential management;
receiving a first method of a plurality of methods from an external device based on a termination of the sequential write in a middle of the sequential write;
reading the first data from the first write region based on the received first method; and
generating a second write region different from the first write region, wherein the second write region comprises one of:
 the first data during the sequential write from a first part of the first write region and second data from a second part of the first write region other than the first part, based on the sequential write completed in the middle,
 the first data during the sequential write from the first part of the first write region and blank data, based on the second write region comprises divided-data, or
 only the second data from the second part of the first write region other than the first part, based on the sequential write is incomplete, wherein the first data during the sequential write is ignored.

\* \* \* \* \*